(12) United States Patent
Martin et al.

(10) Patent No.: US 10,473,061 B2
(45) Date of Patent: Nov. 12, 2019

(54) METHOD AND SYSTEM FOR ENGINE WATER INJECTION

(71) Applicant: Ford Global Technologies, LLC, Dearborn, MI (US)

(72) Inventors: Douglas Raymond Martin, Canton, MI (US); John Eric Rollinger, Troy, MI (US); Kenneth James Miller, Canton, MI (US); Aed M. Dudar, Canton, MI (US); Lauren Angelina Martin, Canton, MI (US)

(73) Assignee: Ford Global Technologies, LLC, Dearborn, MA (US)

( * ) Notice: Subject to any disclaimer, the term of this patent is extended or adjusted under 35 U.S.C. 154(b) by 430 days.

(21) Appl. No.: 15/465,465

(22) Filed: Mar. 21, 2017

(65) Prior Publication Data
US 2018/0274488 A1    Sep. 27, 2018

(51) Int. Cl.
| | |
|---|---|
| *F02M 25/022* | (2006.01) |
| *F02M 25/03* | (2006.01) |
| *F01N 3/04* | (2006.01) |
| *F02B 39/16* | (2006.01) |
| *B60S 1/50* | (2006.01) |

(52) U.S. Cl.
CPC ........... *F02M 25/0227* (2013.01); *F01N 3/04* (2013.01); *F02M 25/0222* (2013.01); *F02M 25/03* (2013.01); *B60S 1/50* (2013.01); *F01N 2610/00* (2013.01); *F02B 2039/164* (2013.01); *F05B 2220/40* (2013.01); *Y02T 10/121* (2013.01)

(58) Field of Classification Search
CPC .................................. F01N 3/04; F02B 39/05
See application file for complete search history.

(56) References Cited

U.S. PATENT DOCUMENTS

| | | | |
|---|---|---|---|
| 4,461,245 A | 7/1984 | Vinokur | |
| 4,548,040 A * | 10/1985 | Miller | .................. F01D 25/002 415/117 |
| 4,558,665 A | 12/1985 | Sandberg et al. | |
| 4,571,151 A | 2/1986 | Paul | |

(Continued)

FOREIGN PATENT DOCUMENTS

EP        2607647 A1    12/2012

OTHER PUBLICATIONS

Bohm, Martin, et al., "Approaches for On-board Water Provision for Water Injection," ATZ Worldwide 2016, vol. 118, pp. 54-57.

(Continued)

*Primary Examiner* — Ngoc T Nguyen
(74) *Attorney, Agent, or Firm* — Geoffrey Brumbaugh; McCoy Russell LLP

(57) ABSTRACT

Methods and systems are provided for injecting water stored in a water reservoir at a plurality of locations in an engine system, including directly into engine cylinders, upstream of a turbocharger turbine, and at an exhaust manifold, and controlling a water level of the water reservoir. In one example, a method may include supplying the water stored in the water reservoir to one or more of a water injection system, a windshield wiper system, an engine coolant system, and a drinking water system based on water supply conditions and responsive to engine operating conditions. When the water level is low (e.g., below a threshold), supply to the water injection system may be prioritized.

20 Claims, 9 Drawing Sheets

(56) References Cited

U.S. PATENT DOCUMENTS

| | | | |
|---|---|---|---|
| 5,944,483 A * | 8/1999 | Beck | F01D 25/002 |
| | | | 415/117 |
| 6,988,485 B2 | 1/2006 | Ichise et al. | |
| 7,168,401 B2 | 1/2007 | Johnson | |
| 7,581,528 B2 | 9/2009 | Stein et al. | |
| 8,667,796 B2 * | 3/2014 | Jarvi | F01D 25/002 |
| | | | 60/619 |
| 9,169,755 B2 | 10/2015 | Ulrey et al. | |
| 2008/0202454 A1 | 8/2008 | Pirault | |
| 2011/0048039 A1 | 3/2011 | Kohavi et al. | |
| 2013/0206100 A1 | 8/2013 | Yacoub | |
| 2013/0291580 A1 | 11/2013 | Lindner | |
| 2016/0083936 A1 | 3/2016 | Martin et al. | |
| 2018/0171936 A1 * | 6/2018 | McQuillen | F02M 25/0227 |

OTHER PUBLICATIONS

Hakeem, Mohannad, et al., "Methods and System for Adjusting Engine Operation Based on Evaporated and Condensed Portions of Water Injected at an Engine," U.S. Appl. No. 15/226,485, filed Aug. 2, 2016, 52 pages.

Leone, Thomas G., et al., "Method for Controlling Water Injection," U.S. Appl. No. 15/285,311, filed Oct. 4, 2016, 54 pages.

* cited by examiner

METHOD AND SYSTEM FOR ENGINE WATER INJECTION

FIELD

The present description relates generally to methods and systems for controlling water collection and water injection in a vehicle system.

BACKGROUND/SUMMARY

Internal combustion engine systems, such as those used to provide motive power to propel a vehicle, frequently operate at high temperatures owing to high combustion temperatures in the engine. The high temperatures may cause engine combustion stability issues and/or component degradation. As such, some engine systems may be configured to increase the amount of fuel provided to the engine during high temperature conditions. Such enrichment of the air-fuel ratio may lower combustion temperatures and prevent component degradation, but doing so increases fuel consumption and may increase emissions.

One example approach for mitigating the effects of high engine/combustion temperatures without enriching the air-fuel ratio is set forth in U.S. Pat. No. 9,169,755. Therein, water may be injected into one or more deactivated cylinders to lower catalyst temperature, thus preventing excessive catalyst temperatures that may lead to catalyst degradation.

However, the inventors herein have recognized an issue with the above approach. While injecting water into one or more deactivated cylinders may help lower catalyst temperature during some conditions, injecting water into one or more deactivated cylinders may not combat high temperature exhaust during higher load conditions where all cylinders are active. Further, injecting water into deactivated cylinders fails to take advantage of the charge dilution effects or other efficiency gains that may be realized with water injection.

In one example, the issues described above may be addressed by a method for a vehicle including, responsive to a turbine temperature being greater than a threshold temperature, injecting water stored at a water reservoir to an inlet of a turbocharger turbine of a turbocharger, responsive to the turbine temperature being less than the threshold temperature and a determined efficiency gain being greater than a threshold gain, injecting water stored at the water reservoir to the inlet of the turbocharger turbine, and responsive to the turbine temperature being less than the threshold temperature and the determined efficiency gain being less than the threshold gain, blocking injection of water stored at the water reservoir to the inlet of the turbocharger turbine. In this way, water may be injected at a turbine inlet in order to lower turbine temperatures, thus avoiding potential turbine degradation that may occur in response to prolonged exposure to high exhaust gas temperatures. Further, the water injection may be performed even when turbine temperatures are not high if an efficiency gain of the turbine that would be exhibited if the water is injected is higher than a threshold. The efficiency gain may include an increase in turbine speed caused by an increase in gas volume acting on the turbine due to the injection and subsequent vaporization of the water. By doing so, turbine degradation may be avoided without enriching air-fuel ratio during virtually any engine operating condition, and while increasing turbine efficiency during at least some conditions.

In another example, a method for a vehicle includes injecting water stored at a water reservoir into one or more of an engine cylinder, an exhaust manifold, and a turbocharger turbine inlet via one or more water injectors of a water injection system based on engine operating conditions. The method further includes, responsive to a first condition, selectively supplying water stored at the water reservoir to one or more of a windshield wiper system, engine coolant system, and drinking water system based on respective water levels in the windshield wiper system, engine coolant system, and drinking water system, and responsive to a second condition, blocking the supply of water stored at the water reservoir to the one or more of the windshield wiper system, engine coolant system, and drinking water system regardless of the respective water levels in the windshield wiper system, engine coolant system, and drinking water system.

In this way, the water reservoir may be used to supply water to one or more water injectors based on operating conditions, and the water reservoir may also be used to supply water to other water-consuming devices of the vehicle. In order to ensure water is available when water injection is commanded, thus preventing unnecessary enrichment that may waste fuel, the supply of water from the reservoir to the other water-consuming devices may be blocked during some conditions, such as when the water level in the water reservoir is low. By doing so, water injection may be used at various places in the engine system to lower gas temperatures and increase engine efficiency, and water may be supplied to auxiliary water-consuming systems, all from a single reservoir, thus simplifying packaging of the water supply to the water-consuming devices and lowering costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
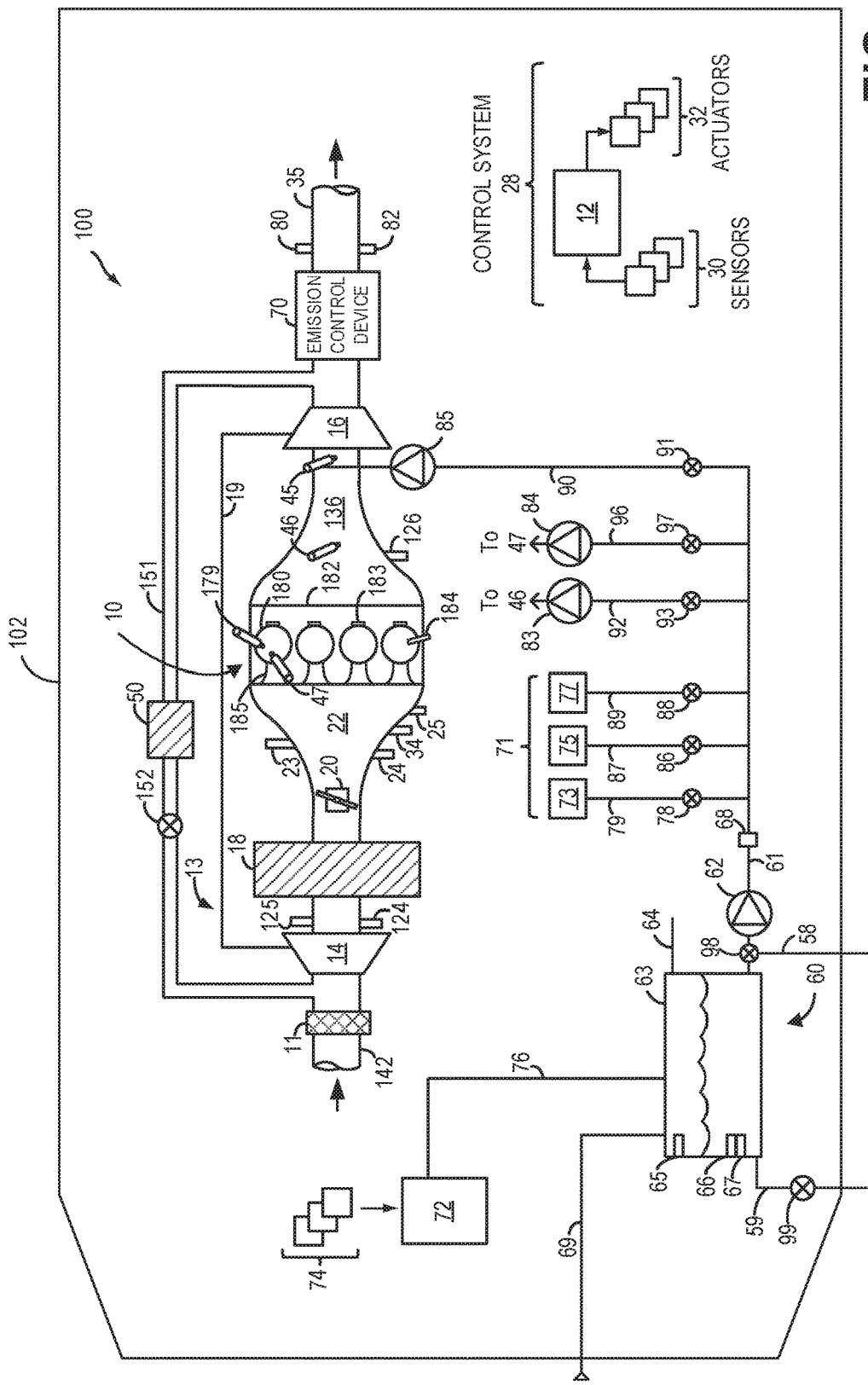
FIG. 1 shows a schematic diagram of an engine system, including a water injection system.
Figure 2:
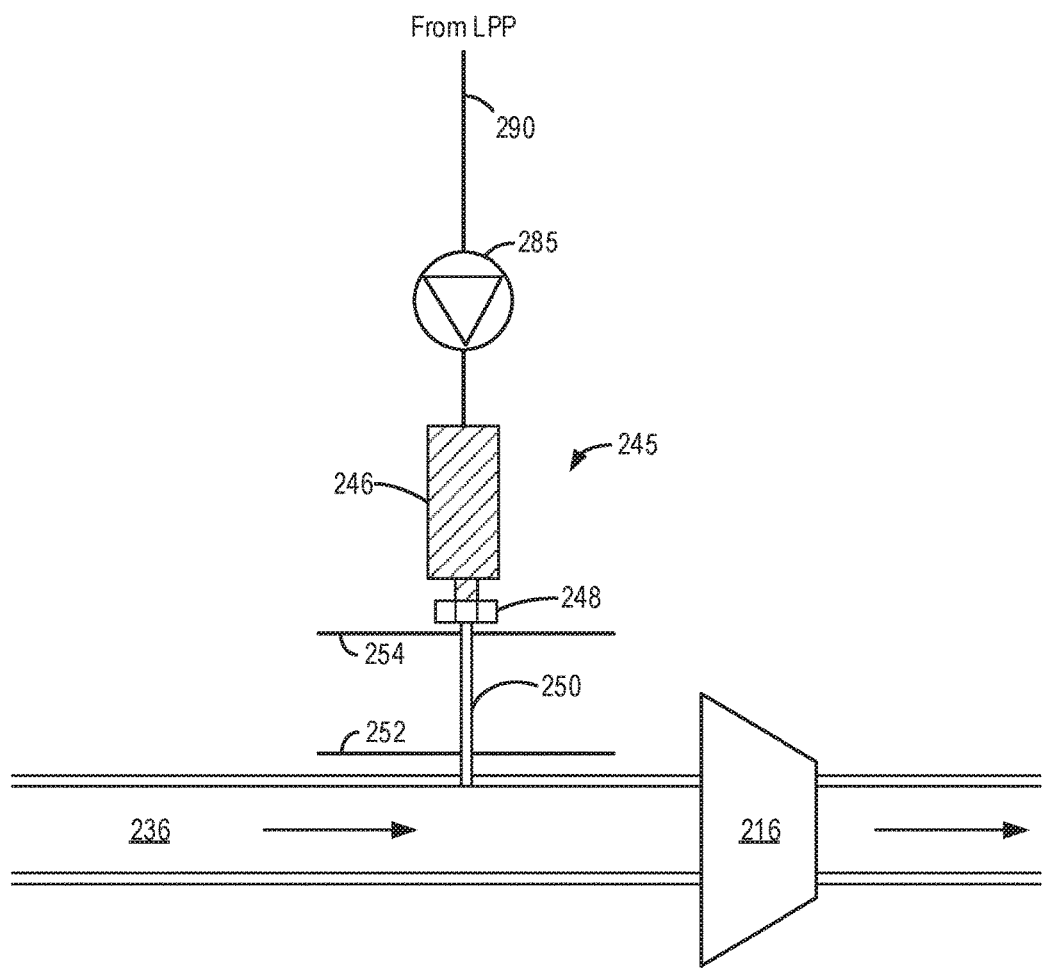
FIG. 2 shows a diagram of an example water injector configured to inject water at an inlet of a turbocharger turbine
Figure 5:
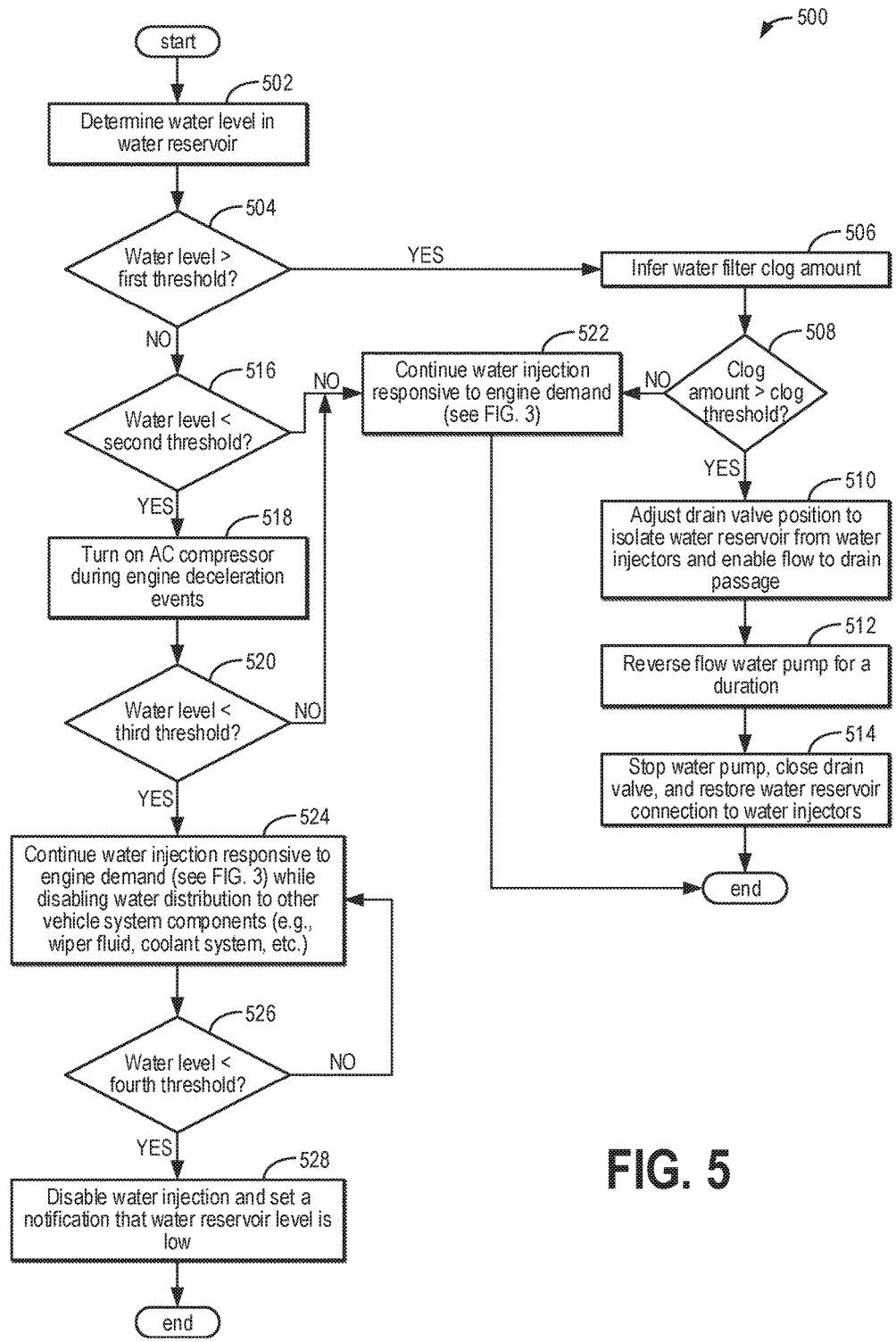
FIG. 5 shows a flow chart of an example method for controlling a water level of a water reservoir and water distribution to various water-consuming devices, including a water injection system.
Figure 6:
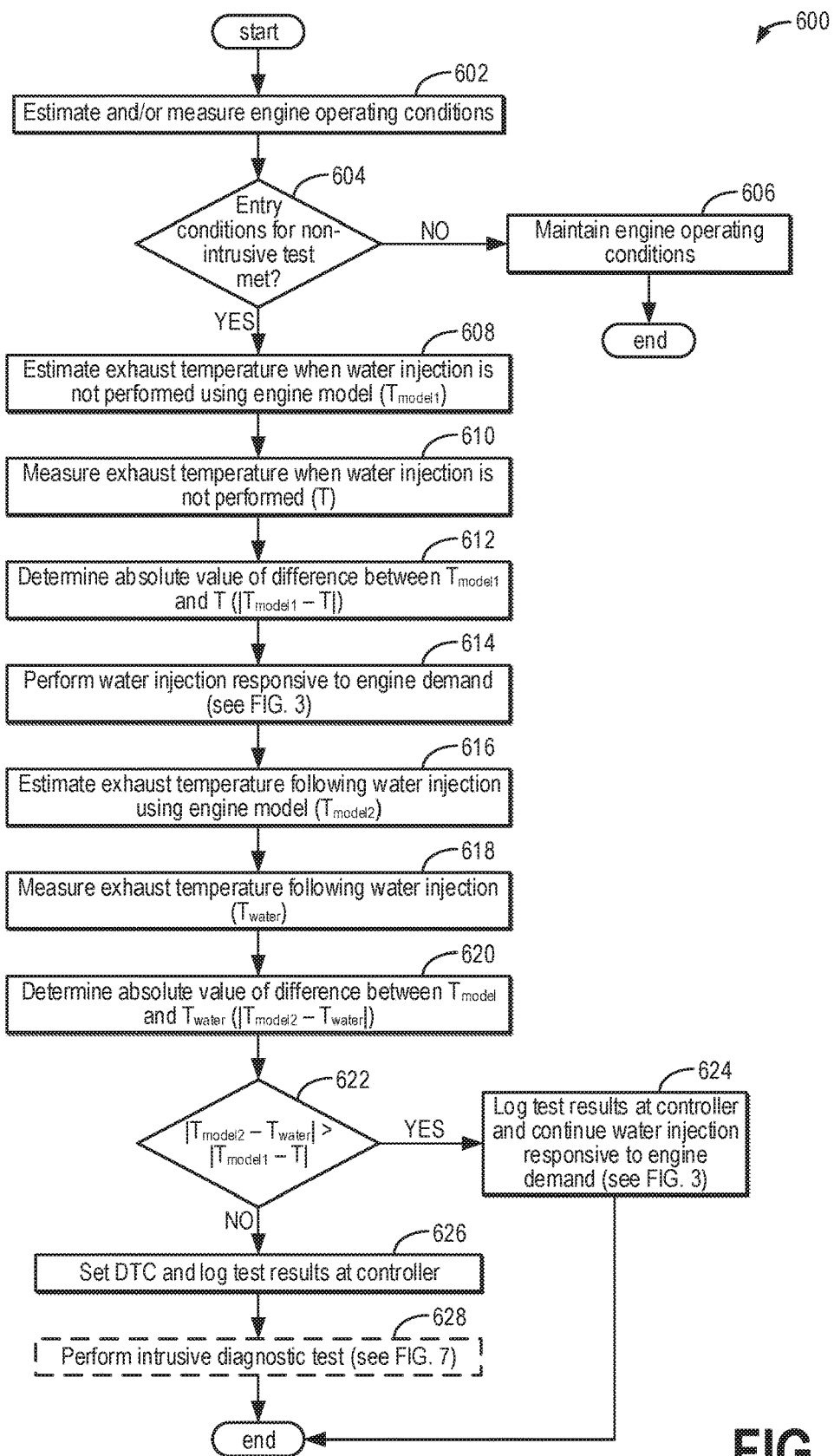
FIG. 6 shows a flow chart of an example method for non-intrusive water injection system diagnostics.
Figure 7:
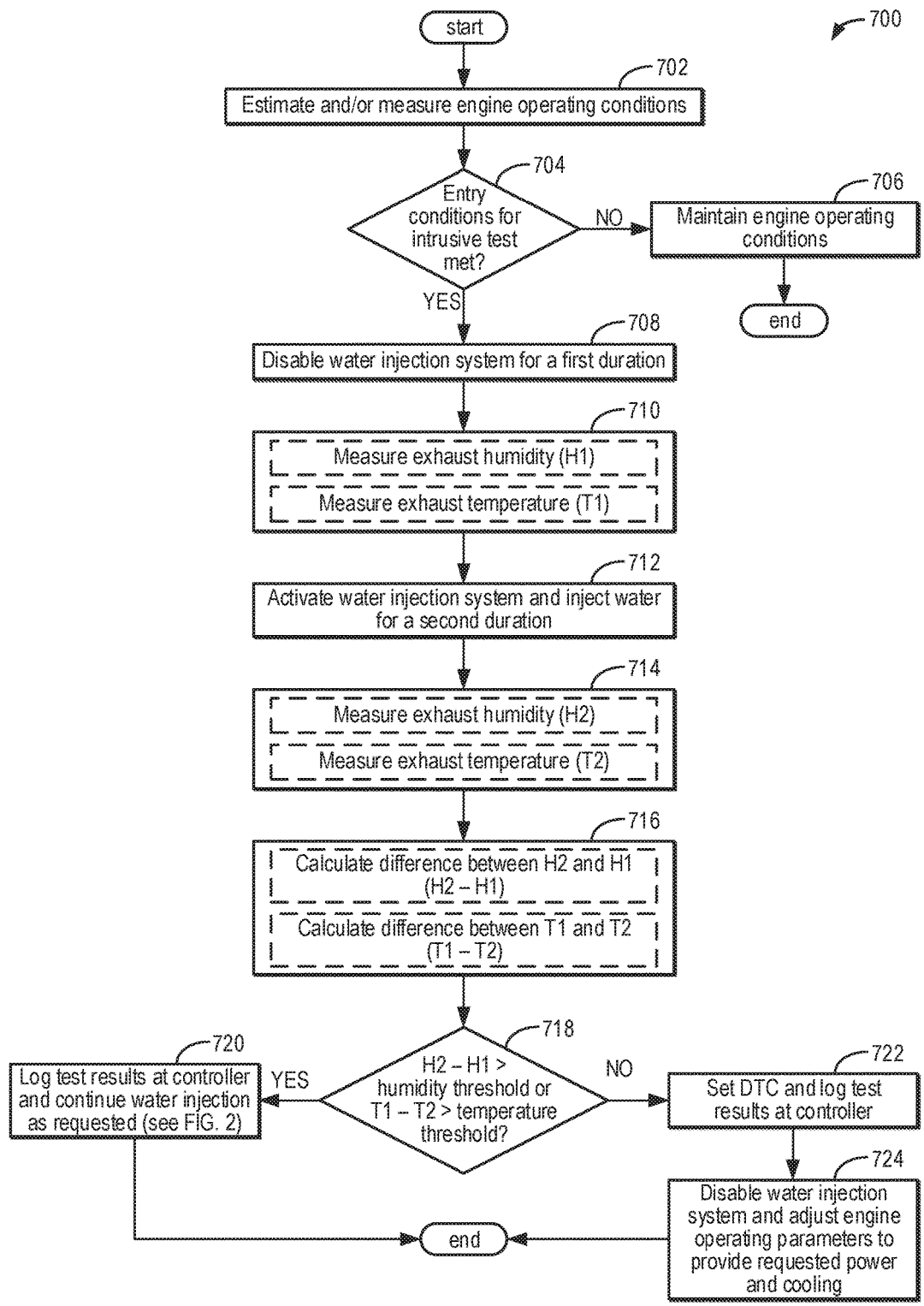
FIG. 7 shows a flow chart of an example method for intrusive water injection system diagnostics.
Figure 8:
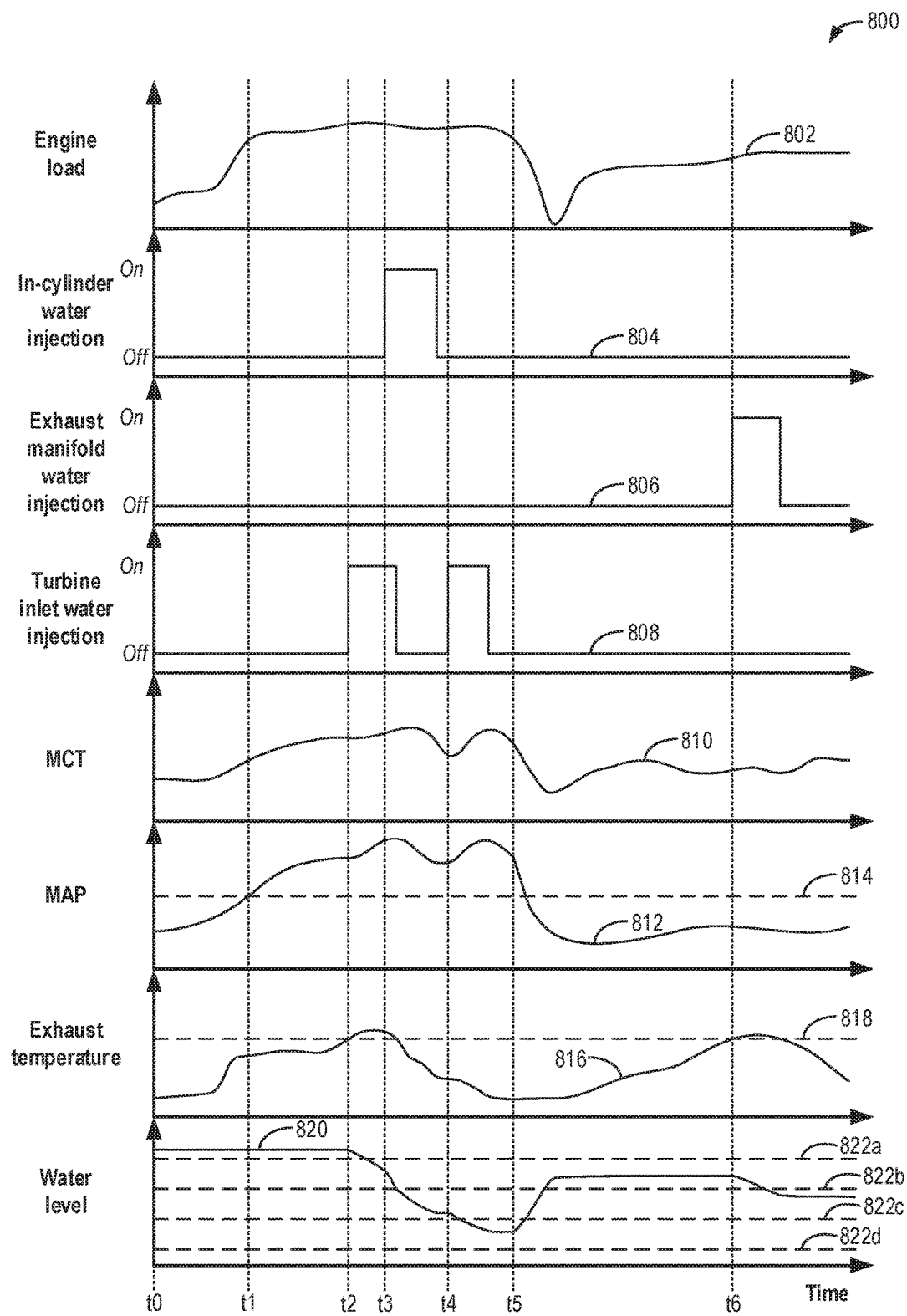
FIG. 8 shows an example graph depicting water injection at a plurality of locations in an engine system responsive to engine operation conditions.
Figure 9:
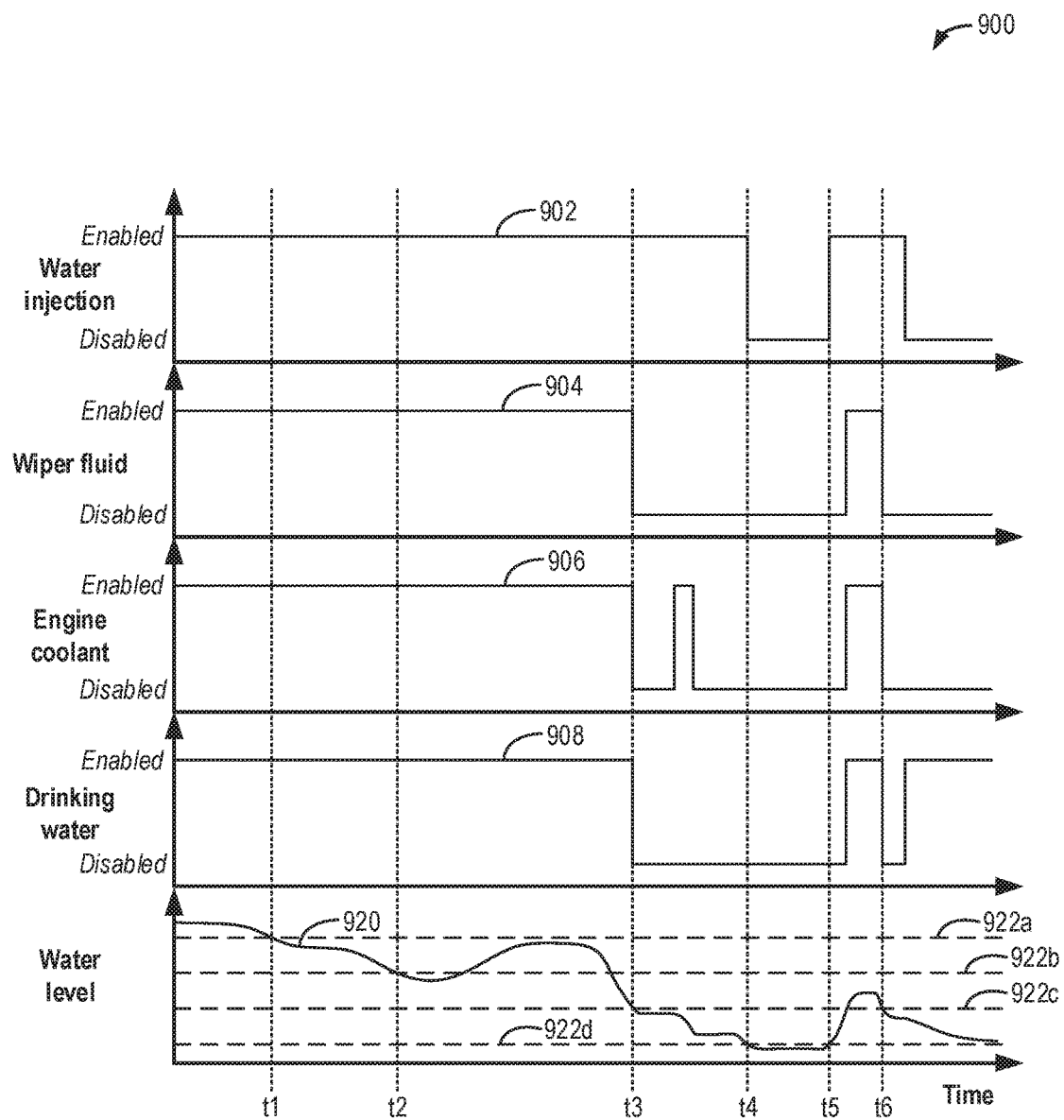
FIG. 9 is an example graph illustrating how water may be selectively supplied to various water-consuming devices responsive to a water level in a water reservoir.

The following description relates to systems and methods for performing water injection at a plurality of locations in an engine system, such as the engine system shown in FIG. 1, using a water injection system. In particular, water may be injected directly into cylinders of the engine, at an exhaust manifold of the engine, or upstream of a turbocharger turbine. In order to withstand high temperatures at the turbocharger turbine, a specialized, heat-resistant water injector may be used, an example of which is shown in FIG. 2. Water injection may be performed according to the example method of FIG. 3, with the water injection location (s) determined responsive to engine operating conditions, for example, according to the method of FIG. 4. As part of determining whether water injection is to be performed, a controller may determine a water level in a water reservoir configured to supply water to various water-consuming devices, including the water injection system, a windshield wiper system, an engine coolant system, and a drinking water system. Water may be selectively supplied to each water-consuming device depending on the water level. For example, as shown in the method of FIG. 5, the supply of water to the water injection system may be prioritized when the water level is low, and water may be collected from various water sources, including condensate that forms at an air conditioning system compressor, to replenish the water supply. FIGS. 6 and 7 illustrate example methods for diagnosing the water injection system to ensure that water is delivered as commanded. FIG. 6 shows a non-intrusive water injection system diagnostic method, whereas FIG. 7 shows an intrusive water injection system diagnostic method. FIG. 8 graphically depicts performing water injection directly into the engine cylinders, at the exhaust manifold of the engine, and upstream of the turbocharger turbine responsive to engine operating conditions (e.g., according to the methods of FIGS. 3 and 4). FIG. 9 shows a prophetic example graph of how water from the water reservoir may be selectively supplied to the various water-consuming devices depending on the water level (for example, according to the method of FIG. 5). Further, FIGS. 8 and 9 both show how the water reservoir may be refilled when it drops below a threshold level. For example, the water reservoir may be refilled with condensate (e.g., as collected from the air conditioning system compressor, a charge air cooler, exhaust gas, etc.) or water separated from fuel, for example, for subsequent use in the water-consuming devices, including the water injection system.

Internal combustion engines may include water injection systems that inject water into a plurality of locations. Often, water injection occurs at an intake manifold upstream of engine cylinders. Injecting water into the engine intake air may increase fuel economy and engine performance as well as decrease engine emissions. When water is injected into the engine intake, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce the production of nitrogen oxides (NOx), while a more efficient fuel mixture may reduce carbon monoxide and hydrocarbon emissions.

Turbocharged engines, which include a turbocharger for providing boosted intake air to the engine, also increase fuel efficiency and additionally reduce carbon dioxide emissions, However, additional improvements in turbo efficiency may further reduce carbon dioxide emissions. As an example, compressing air with a compressor of the turbocharger rapidly increases temperatures of the intake air and, in turn, exhaust gases and components (such as a turbine of the turbocharger). Fuel enrichment may be used to decrease these temperatures. However, increasing fuel usage for cooling purposes is inefficient.

Water injection may be used to cool the intake air charge, as described above. A cooler intake air charge may lead to cooler exhaust gases and components. However, if water injection is performed at the intake manifold, in some cases, the amount of water able to be injected may be insufficient to provide cooling, as the amount needed may exceed a combustion tolerance of the engine. Additionally, the injected water has to evaporate in the intake manifold, displacing air and reducing the ability of air charge to enter engine cylinders during peak flow conditions. Any water that does not evaporate does not reach the engine cylinders, which limits the amount of water than can be used.

Water injection directly into engine cylinders may overcome limitations of intake manifold water injection. Additionally, water injection at other locations in the engine system, such as at an exhaust manifold, may provide exhaust cooling without affecting engine dilution.

Water may be stored in a vehicle to provide water for injection on demand. However, in order to meet the water injection demands of an engine, a vehicle needs to have a sufficient supply of water. In one example, a water storage tank (e.g., reservoir) of a water injection system may be manually refilled by a vehicle operator. However, in some situations, water for refilling the tank, such as distilled water, may not be readily available, and having to refill the tank may be undesirable for the vehicle operator.

Turning to the figures, FIG. 1 shows a schematic illustration of an embodiment of a water injection system 60 and an engine system 100 in a motor vehicle 102. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake air compressor, such as a motor-driven or driveshaft-driven supercharger compressor. In engine system 100, compressor 14 is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through a charge air cooler (CAC) 18 to a throttle valve (e.g., intake throttle) 20. CAC 18 may be an air-to-air or air-to-coolant heat exchanger, for example. Throttle valve 20 is coupled to an engine intake manifold 22. From compressor 14, the hot, compressed air charge enters the inlet of CAC 18, cools as it travels through CAC 18, and then passes through throttle valve 20 to intake manifold 22. In the embodiment shown in FIG. 1, the pressure of the air charge within the intake manifold is sensed by a manifold air pressure (MAP) sensor 24, and a boost pressure is sensed by a boost pressure sensor 124. A compressor bypass valve (not shown) may be coupled in series between the inlet and the outlet of compressor 14. The compressor bypass valve may be a normally closed valve configured to open under selected operating conditions to relieve excess boost pressure. For example, the compressor bypass valve may be opened during conditions of decreasing engine speed to avert compressor surge.

Intake manifold 22 is coupled to a series of combustion chambers or cylinders 180 through a series of intake valves (not shown) and intake runners (e.g., intake ports) 185. As shown in FIG. 1, the intake manifold 22 is arranged upstream of all combustion chambers 180 of engine 10. Sensors, such as a manifold charge temperature (MCT) sensor 23 and an air charge temperature sensor (ACT) 125, may be included to determine the temperature of intake air at the respective locations in the intake passage. In some examples, the MCT and the ACT sensors may be thermistors, and the output of the thermistors may be used to determine the intake air temperature in intake passage 142. MCT sensor 23 may be positioned between throttle valve 20 and the intake valves of the combustion chambers 180. ACT sensor 125 may be located upstream of CAC 18 as shown; however, in alternate embodiments, ACT sensor 125 may be positioned upstream of compressor 14. The air temperature may be further used in conjunction with an engine coolant temperature (ECT), as measured by an ECT sensor 25, in computing an amount of fuel that is delivered to the engine, for example.

Each combustion chamber 180 may further include a spark plug 184 for providing an ignition spark in response to a spark advance signal from a controller 12 as well as a knock sensor 183 for identifying abnormal combustion events. Outputs of the knock sensors of each combustion chamber 180 may be used to detect maldistribution of water to each combustion chamber 180, where the water is injected upstream of all the combustion chambers 180. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by a cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake or the combustion chambers 180 themselves by one or more water injectors. In the depicted embodiment, water injection system 60 includes a water injector 47 for injecting water directly into one or more combustion chambers 180. Although only one representative injector 47 is shown in FIG. 1, each combustion chamber 180 may include its own injector.

As shown in FIG. 1, water injection system 60 is also configured to inject water upstream of turbine 16 (e.g., at an inlet of turbine 16) via a water injector 45 and into exhaust manifold 136 via a water injector 46. Due to potentially high temperatures at the inlet of turbine 16, water injector 45 may be a specialized injector that is insulated and heat-shielded, as described with respect to FIG. 2. Similarly, water injector 46 may also be the specialized injector due to high temperatures at exhaust manifold 136. In another embodiment, the water injection system may be configured to inject water at additional locations. For example, the water injection system may be configured to inject water upstream of throttle valve 20 or into intake manifold 22 downstream of throttle valve 20.

In alternate embodiments, a water injection system may include water injectors positioned at one or more of these positions. For example, an engine may include only water injector 45, in one embodiment. In another embodiment, an engine may include each of water injector 45, water injector 46, and water injectors 47 (one at each combustion chamber). Water may be delivered to water injectors 45, 46, and 47 by the water injection system 60, as described further below.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. A universal exhaust gas oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from exhaust manifold 136 is directed to turbine 16 to drive the turbine. When reduced turbine torque is desired, some exhaust may be directed instead through a wastegate (not shown), bypassing the turbine. The combined flow from turbine 16 and the wastegate then flows through an emission control device 70. In general, one or more emission control devices 70 may include one or more exhaust after-treatment catalysts configured to treat the exhaust flow and reduce an amount of one or more substances in the exhaust flow.

All or part of the treated exhaust from emission control device 70 may be released into the atmosphere via an exhaust passage 35. Depending on operating conditions, however, a portion of exhaust may be diverted instead to an exhaust gas recirculation (EGR) passage 151 upstream of emission control device 70 and downstream of turbine 16 and travel through an EGR cooler 50 and an EGR valve 152 to the inlet of compressor 14. In this manner, compressor 14 is configured to admit exhaust tapped from downstream of turbine 16. EGR valve 152 may be opened to allow a controlled amount of cooled exhaust gas to flow to the inlet of compressor 14 for desirable combustion and emissions-control performance. In this way, engine system 100 is adapted to provide external, low pressure (LP) EGR. The rotation of the compressor, in addition to the relatively long LP EGR flow path in engine system 100, provides excellent homogenization of the exhaust gas into the intake air charge. Further, the disposition of EGR pick-up and mixing points provides effective cooling of the exhaust gas for increased available EGR mass and increased performance. In other embodiments, the EGR system may be a high pressure EGR system with EGR passage 151 connecting from upstream of turbine 16 to downstream of compressor 14. In some embodiments, the MCT sensor 23 may be positioned to determine the manifold charge temperature, and may include air and exhaust recirculated through the EGR passage 151.

An intake oxygen sensor 34 is configured to provide an estimate regarding the oxygen content of fresh air received in the intake manifold. In addition, when EGR is flowing, a change in oxygen concentration measured by oxygen sensor 34 may be used to infer an EGR amount and used for accurate EGR flow control, as described further below. In the depicted example, oxygen sensor 34 is positioned downstream of throttle valve 20 and downstream of charge air cooler 18. However, in alternate embodiments, intake oxygen sensor 34 may be positioned upstream of throttle valve 20.

Intake oxygen sensor 34 may be used for estimating an intake oxygen concentration and inferring an amount of EGR flow through the engine based on a change in the intake oxygen concentration upon the opening of EGR valve 152. Specifically, a change in the output of the sensor upon the opening of EGR valve may be compared to a reference point wherein the sensor is operating with no EGR (a zero point). Based on the change (e.g., decrease) in oxygen amount compared to when no EGR is provided, an EGR flow currently provided to the engine may be calculated. For example, upon applying a reference voltage (Vs) to intake oxygen sensor 34, a pumping current (Ip) is output by the sensor. The change in oxygen concentration may be proportional to the change in pumping current (delta Ip) output by the sensor relative to sensor output in the absence of EGR (the zero point). Based on a deviation of the estimated EGR flow from the expected (or target) EGR flow, further EGR control may be performed.

In a similar manner, UEGO sensor 126 is configured to measure the oxygen content of exhaust gas received in exhaust manifold 136, which may vary with combustion air-fuel ratio, fuel alcohol content, and ambient humidity. UEGO sensor 126 may also be used to infer an amount of water injected into combustion chambers 180 based on a change in oxygen concentration following water injection.

It will be appreciated that each of the intake oxygen sensor 34 and UEGO sensor 126 may be operated in various modes based on the engine operating conditions and further based on the nature of the estimation being performed by the sensor. For example, during engine fueling conditions when dilution/EGR estimation is required, intake oxygen sensor 34 may be operated in a nominal mode with a (fixed) reference voltage applied to the sensor and maintained during the sensing. Similarly, during engine fueling conditions when exhaust air-fuel ratio estimation is required, the UEGO sensor 126 may be operated in a nominal mode with a (fixed) reference voltage applied to the sensor and maintained during the sensing. In one example, the reference voltage may be 450 mV. During other conditions, such as during engine non-fueling conditions when humidity estimation is required, one or more of intake oxygen sensor 34 and UEGO sensor 126 may be operated in a variable voltage mode with the reference voltage applied to the sensor modulated. In still another example, the sensor may be operated in the variable voltage mode when EGR or dilution estimation is performed while fuel vapor purge (from a fuel system canister) or positive crankcase ventilation (of the engine crankcase) is enabled. Likewise, during conditions when exhaust dilution estimation is required following a water injection, UEGO sensor 126 may be operated in the variable voltage mode. Therein, the reference voltage of the oxygen sensor is modulated between the nominal reference voltage (e.g., 450 mV) and a higher reference voltage (e.g., 950 mV). For example, the nominal reference voltage may be a voltage that does not dissociate molecular water ($H_2O$), and the higher reference voltage may be a voltage that does dissociate $H_2O$. In this way, the humidity (e.g., amount of water) in the intake air (as measured by intake oxygen sensor 34) and/or the exhaust gas (as measured by UEGO sensor 126) may be determined.

Continuing with FIG. 1, water injection system 60 includes a water reservoir 63, a water pump 62, a water collection system 72, and a water filling passage 69. In embodiments that include multiple injectors, a common water passage 61 configured to distribute water from water reservoir 63 to the water injectors (among other water-consuming devices) may contain one or more valves, such as solenoid valves, to select between the different water injectors (and other water-consuming devices). For example, as shown in FIG. 1, water from common water passage 61 may be diverted through one or more of a valve 91 and a passage 90 branching from common water passage 61 to deliver water to injector 45. Similarly, water may be delivered to injector 46 from common water passage 61 via a valve 93 and a passage 92, and water may be delivered to injector 45 via a valve 97 and a passage 96. Further, embodiments that include multiple injectors may include a plurality of temperature sensors proximate to each injector to determine engine temperature at one or more water injectors. A plurality of additional water-consuming devices 71 may also branch off from common water passage 61, including additional water passages and valves for controlling the delivery of water to each device. For example, as shown in FIG. 1, the plurality of additional water-consuming devices 71 may include a windshield wiper fluid system 73 coupled to a water passage 79 with a valve 78 positioned therein, an engine coolant system 75 coupled to a water passage 87 with a valve 86 positioned therein, and a drinking water system 77 coupled to a water passage 89 with a valve 88 positioned therein.

Common water passage 61 may be fluidically coupled to a filter 68, which may remove small impurities contained in the water that could potentially damage engine components. For example, filter 68 may be a standard carbon charcoal filter with silver. In other examples, filter 68 may comprise a series of filters, including particulate filters of various pore sizes (e.g., ranging from larger pore filters, such as 10 microns, for removing coarse particles to smaller pore filters, such as 0.1 microns, for removing microorganisms), carbon charcoal filters, and ion exchange resins, for producing potable water. In still other examples, additional filters may be coupled to additional water passages, such as manual filling passage 69.

Water pump 62 may be operated by controller 12 to provide water to water injectors 45, 46, and 47 via common water passage 61. Water pump 62 may be a low pressure pump (LPP), for example. In the example of FIG. 1, each water injector additionally has a high pressure pump (HPP) configured to further pressurize water for injection. Water injector 45 is shown receiving pressurized water from a HPP 85 coupled to passage 90, water injector 46 is shown receiving pressurized water from a HPP 83 coupled to passage 92, and water injector 47 is shown receiving pressurized water from a HPP 84 coupled to passage 96. In an alternate embodiment, the water injection system 60 may include a single water pump, such as water pump 62, for delivering water to the water injectors. In addition, the injection system may comprise a self-pressurized piston pump that can perform both high pressure pumping and injection. For example, one or more of the injectors may include or be coupled to a self-pressurized piston pump.

A valve 98 may be included in common water passage 61 between water reservoir 63 and water pump 62 and coupled to a drain passage 58. For example, valve 98 may be actuated to isolate water reservoir 63 from water-consuming components, such as the water injectors, in order to clean filter 68, as will be described with respect to FIG. 5. Under nominal conditions, valve 98 may be positioned to allow water to flow from water reservoir 63 to water pump 62 and block the flow of water to drain passage 58. Under filter cleaning conditions, valve 98 may be positioned to block the flow of water from water reservoir 63 to water pump 62 and allow water contained in common water passage 61 to flow in reverse (e.g., by reversing the pumping direction of water pump 62) and drain to the vehicle exterior via drain passage 58.

Water reservoir 63 may include a water level sensor 65, a water quality sensor 66, and a water temperature sensor 67, which may relay information to controller 12. For example, in freezing conditions, water temperature sensor 67 detects whether the water in reservoir 63 is frozen or available for injection. In some embodiments, an engine coolant passage (not shown) may be thermally coupled with reservoir 63 to thaw frozen water. Water quality sensor 66 may detect whether the water in water reservoir 63 is suitable for injection. As one example, water quality sensor 66 may be a conductivity sensor. The level of water stored in water tank 63, as identified by water level sensor 65, may be communicated to a vehicle operator and/or used to adjust engine operation. For example, a water gauge or indication on a vehicle instrument panel (not shown) may be used to communicate the level of water. In another example, the level of water in water reservoir 63 may be used to determine whether sufficient water for injection is available, as described below with reference to FIGS. 3 and 5. In the depicted embodiment, water reservoir 63 may be manually refilled via water filling passage 69 and/or refilled automatically by collection system 72 via a water reservoir filling passage 76. Collection system 72 may be coupled to one or more components 74 that refill the water reservoir with condensate collected from various engine or vehicle systems. In one example, collection system 72 may be coupled with the EGR system to collect water condensed from exhaust passing through the EGR system. In another example, collection system 72 may be coupled with an air conditioning system. Collection system 72 may further be coupled to CAC 18 and exhaust passage 35 for recovering condensate as well as a water-fuel separator that isolates water from fuel on its way to the fuel tank. As water collected from the exhaust condensate and from fuel may contain contaminants (e.g., dissolved hydrocarbons, sulfur dioxides, NOx, etc.), the water may be sufficiently purified to become potable prior to its distribution to the drinking water system, as described above. In another example, water collect from the exhaust condensate and from fuel is stored in a separate water reservoir and not included in the water distributed to the drinking water system.

Water reservoir 63 may further include a water overflow line 64, which may allow water to flow from water reservoir 63 to the vehicle exterior when water reservoir 63 is filled beyond a maximum capacity. Further, a drain passage 59 with a valve 99 included therein may be coupled to water reservoir 63 so that when valve 99 is actuated open, water drains from water reservoir 63 to the vehicle exterior. For example, water reservoir 63 may be emptied responsive to determining that the water is not suitable for injection, for example, as measured by water quality sensor 66. In another example, water reservoir 63 may be emptied periodically (e.g., after a duration has elapsed).

FIG. 1 further shows a control system 28. Control system 28 may be communicatively coupled to various components of engine system 100 to carry out the control routines and actions described herein. For example, as shown in FIG. 1, control system 28 may include controller 12, which may be an electronic digital controller. Controller 12 may be a microcomputer, including a microprocessor unit, input/output ports, an electronic storage medium for executable programs and calibration values, random access memory, keep alive memory, and a data bus. Controller 12 is shown receiving input from a plurality of sensors 30, which may include user inputs and/or sensors. In addition to those previously described, sensors 30 may further include a sensor for determining transmission gear position, a pedal position sensor, a brake input sensor, a transmission selector position sensor, wheel speed sensors used to give an indication of vehicle speed, an engine speed sensor, an exhaust pressure sensor 80 coupled to exhaust passage 35, an exhaust temperature sensor 82 coupled to exhaust passage 35, and others. Furthermore, controller 12 may communicate with various actuators 32, which may include engine actuators (such as fuel injectors 179, throttle valve 20, spark plugs, the various water injectors, wastegates, EGR valve 152, etc.). In some examples, the storage medium may be programmed with computer readable data representing instructions executable by the processor for performing the methods described below as well as other variants that are anticipated but not specifically listed. The controller 12 receives signals from the various sensors of FIG. 1 and employs the various actuators of FIG. 1 to adjust engine operation based on the received signals and instructions stored on a memory of the controller. For example, injecting water to the engine system may include adjusting an actuator of injector 45, injector 46, and/or injector 47 to inject water, and adjusting water injection may include adjusting an amount or timing of water injected via adjustments to a duty cycle of the injector.

In this way, the system of FIG. 1 presents an example system that may be used to inject water at one or more locations in an engine, such as directly into engine cylinders, in an exhaust manifold, and at a turbine inlet. Water injection directly into the cylinders may be used to reduce an in-cylinder temperature, thereby reducing knock, and increase volumetric efficiency of the engine. Additionally, in-cylinder water injection may be used to increase engine dilution and thereby reduce engine pumping losses. Water injection at the exhaust manifold may be used for exhaust cooling, for example, to prevent catalyst overheating. Water injection at the turbine inlet may also be used for exhaust cooling as well as to increase engine and/or turbine efficiency. Of note, an exhaust manifold water injector, a turbine water injector, and/or any other injectors configured to cool the catalyst may be positioned at least a threshold distance from the catalyst or other components that may be susceptible to thermal shock in order to allow the water to approach exhaust temperature before reaching the component. Under different engine operating conditions, such as different engine load and/or speed conditions, it may be advantageous to inject water at one location over another to achieve increased cooling, dilution, fuel efficiency, or engine power, as will be further described with respect to FIGS. 3 and 4.

As mentioned above, a water injector configured to deliver water to an inlet of a turbocharger turbine may be a specialized water injector in order to withstand high temperatures at the turbine inlet. FIG. 2 shows a diagram of an example embodiment of a water injector 245, which may correspond to water injector 45 of FIG. 1. For example, water injector 245 may be configured to inject water upstream of a turbine 216 in an exhaust system. In other examples, water injector 245 may be configured to inject water at other locations within a vehicle system that may be exposed to high temperatures, such as at an exhaust manifold.

As shown in FIG. 2, water from a water reservoir may be delivered to water injector 245 via a low pressure pump (such as water pump 62 of FIG. 1), a water passage 290, and a high pressure pump 285. Water injector 245 may include an injector body 246 and an insulated connector 248 that connects the injector body 246 to a long, narrow nozzle 250. Nozzle 250 may be coupled to an exhaust passage 236 upstream of turbine 216 so that high-pressure water may be injected into exhaust passage 236 at the turbine inlet. The length of nozzle 250 serves to increase the distance of injector body 246 from components of the exhaust system, which may be hot due to hot exhaust gas flowing within. Injector body 246 is further isolated from exhaust passage 236 by a first heat shield 252 and a second heat shield 254, which may be separated by an air gap. Heat shields 252 and 254 may be comprised of any heat-resistant materials, such as metal or ceramic. Note that the components of FIG. 2 are illustrative in purpose and not necessarily drawn to scale.

Figure 3:
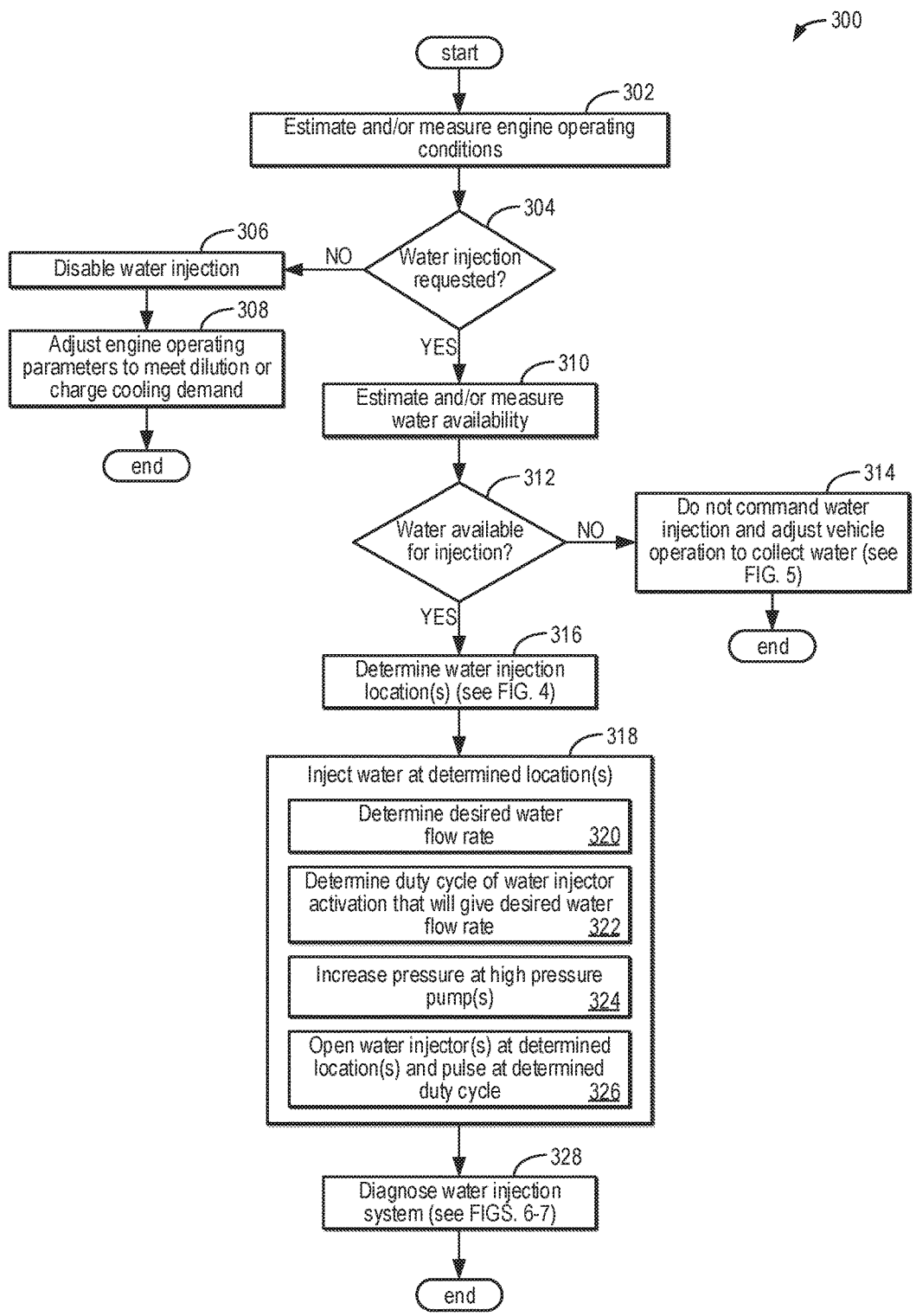
FIG. 3 shows a flow chart of an example method for injecting water into an engine based on an injection request.

Turning to FIG. 3, an example method 300 for injecting water into an engine is depicted. Instructions for carrying out method 300 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation according to the methods described below. In one example, water may be injected via one or more water injectors using water stored in a water reservoir of a water injection system (such as water reservoir 63 of water injection system 60 shown in FIG. 1).

Method 300 begins at 302 and includes estimating and/or measuring engine operating conditions. For example, engine operating conditions may include driver torque demand; manifold pressure (MAP) as measured by a MAP sensor (such as MAP sensor 24 of FIG. 1); an air-fuel ratio of gas exhausted by the engine (e.g., as measured by UEGO sensor 126 of FIG. 1); spark timing; ambient conditions, including ambient temperature, pressure, and humidity; boost pressure (e.g., as measured by boost pressure sensor 124 of FIG. 1); an exhaust gas recirculation (EGR) rate; a mass air flow (MAF); manifold charge temperature (MCT) (e.g., as measured by MCT sensor 23 of FIG. 1); engine speed and/or load; an engine knock level; etc.

At 304, method 300 includes determining if water injection is requested. Water injection may be requested to leverage one or more benefits associated with water injection. For example, water injection may be requested at low-mid engine loads to increase charge dilution, thereby improving combustion stability in the low-mid load engine operating region. As another example, water injection may be requested at mid-high engine loads to increase charge cooling, thereby improving knock relief in the mid-high load engine operating region. Further still, water injection may be requested at high loads to provide component cooling, such as to cool exhaust gas, an exhaust catalyst, etc. Further, water injection may be requested responsive to engine load being higher than a threshold load (below which engine combustion stability may be affected) and spark timing being retarded (e.g., from MBT) by more than a threshold amount.

In one example, water injection may be requested in response to a manifold temperature being greater than a first threshold temperature. Additionally, water injection may be requested when a threshold engine speed or load is reached. In yet another example, water injection may be requested based on an engine knock level being above a threshold. Further, water injection may be requested in response to an exhaust gas temperature being above a second threshold temperature. In addition, water may be injected when an inferred octane number of a fuel used is below a threshold.

If water injection is not requested, method 300 proceeds to 306 and includes disabling water injection. For example, engine operation is continued without water injection.

At 308, method 300 includes adjusting engine operating parameters to meet dilution or charge cooling demand. For example, engine operating parameter adjustments may include enriching the air-fuel ratio, reducing an amount of throttle opening to decrease manifold pressure, or retarding spark timing to provide knock relief. As another example, engine operation adjustments may include adjusting EGR flow, such as by adjusting an opening of an EGR valve (e.g., EGR valve 152 of FIG. 1) to change charge dilution. For example, to increase the charge dilution, the opening of the EGR valve may be increased, and to decrease the charge dilution, the opening of the EGR valve may be decreased. Following 308, method 300 ends.

Returning to 304, if water injection is requested, method 300 proceeds to 310 and includes estimating and/or measuring water availability. Water availability may be determined based on the output of a plurality of sensors, such as a water level sensor, a water quality sensor, and/or a water temperature sensor disposed in the water reservoir of the water injection system of the engine (such as water level sensor 65, water quality sensor 66, and water temperature sensor 67 shown in FIG. 1).

At 312, it is determined if water is available for injection. For example, water in the water reservoir may be unavailable for injection in freezing conditions (e.g., when the water temperature in the tank is below a threshold level, where the threshold level is at or near a freezing temperature). In another example, water in the water reservoir may be unavailable for injection if the level of water in the water reservoir is below a threshold level, where the threshold level is based on an amount of water required for an injection event or a period of injection cycles. If water is unavailable for injection, method 300 proceeds to 314 and includes not commanding water injection and adjusting vehicle operation to collect water. For example, the controller may refill the water reservoir by increasing on-board collection of water from one or more vehicle systems, as described further with regard to FIG. 5. Following 314, method 300 ends.

Figure 4:
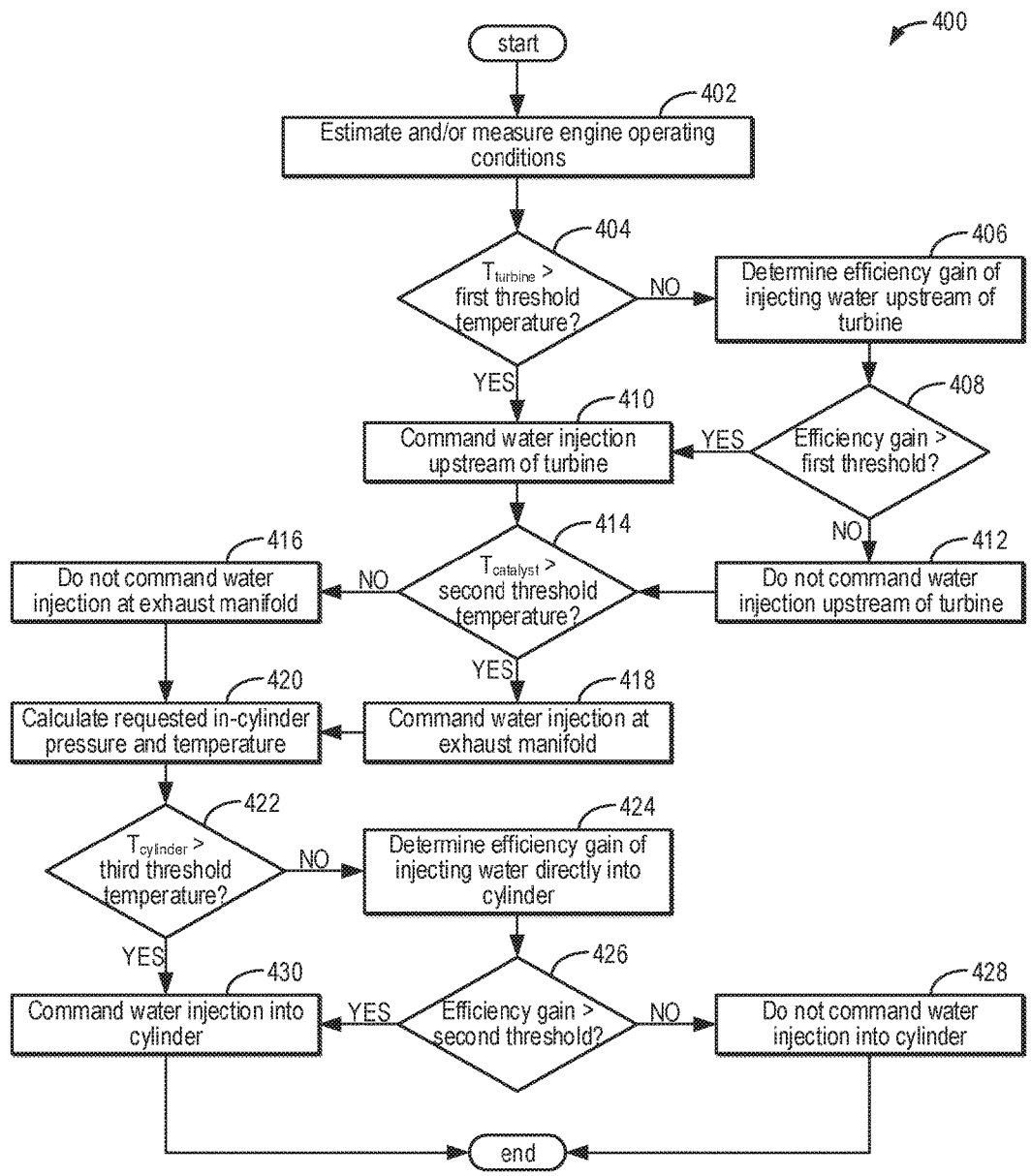
FIG. 4 shows a flow chart of an example method for determining water injection location in an engine system responsive to engine operating conditions.

If instead water is available for injection, method 300 proceeds to 316 and includes determining water injection location(s), as described with regard to FIG. 4. For example, water injection may be requested upstream of a turbine (e.g., turbine 16 of FIG. 1) of a turbocharger (e.g., turbocharger 13 of FIG. 1) in order to cool the turbine and other components of the exhaust system, such as a catalyst (e.g., emission control device 70 of FIG. 1), and/or to increase the efficiency of the turbocharger. In another example, water injection may be requested at an exhaust manifold (e.g., exhaust manifold 136 of FIG. 1) in order to lower exhaust temperatures, especially during non-turbo applications. In still another example, water injection may be requested directly into one or more cylinders of the engine (e.g., cylinders 180 of FIG. 1) in order to increase charge dilution, reduce knock, and/or lower exhaust temperature.

At 318, method 300 includes injecting water at the determined location(s). Injecting water at the determined location(s) includes determining a desired water flow rate, as indicated at 320, and determining a duty cycle of water injector activation that will give the desired water flow rate, as indicated at 322. For example, the controller may determine an amount of water to inject based on one or more of an engine speed/load, temperature, and knock. For example, the controller may refer a look-up table that uses engine speed and load as an input and provides a net (total) amount of water to command for water injection as an output, which can then be converted into the flow rate. Further, based on the desired location(s) of requested water injection, the controller may determine a proportion of the total commanded water injection amount to be delivered via the different water injectors (herein also referred to as a water injection ratio). The proportioning may be based on the desired outcome of water injection (e.g., cooling versus charge dilution) and the total commanded amount in relation to the duty cycle of the individual injectors and injector constraints. Valves in passages delivering water to injectors at the determined locations may be opened to enable water to flow from the water reservoir to the selected injectors, with each valve opened according to the water injection ratio. For example, if a greater proportion of water is to be delivered to a first water injector than a second water injector, a first valve coupled to a first passage for delivering water to the first water injector may be opened to a greater degree than a second valve coupled to a second passage for delivering water to the second injector. Injecting water at the determined location(s) further includes increasing pressure at high pressure pump(s) configured to deliver water to the injectors at the determined location(s), as indicated at 324, and opening the water injector(s) at the determined location (s) and pulsing at the determined duty cycle, as indicated at 326. For example, the controller may send a signal to an actuator of a selected water injector to vary the pulse-width of the injector, thereby delivering the determined amount of water. Additionally, a temperature of the water for injection may be maintained below a vaporization point by adjusting the pressure of the high pressure pump, opening the water injector, and/or adjusting the duty cycle of the water injector.

It will be appreciated that one or more engine operating parameters may be adjusted responsive to the commanded water injection. As an example, spark timing may be advanced (e.g., towards MBT from a current timing that is retarded from MBT) responsive to the water injection. In one example, the degree of spark advance may be increased as the water injection amount increases.

At 328, method 300 includes diagnosing the water injection system, as will be described further below with regard to FIGS. 6 and 7. Briefly, the controller may compare an output of a selected sensor, such as a humidity sensor or a temperature sensor, from before the water injection to sensor output after the water injection to determine if the commanded amount of water was delivered to the engine. As discussed earlier, the actual water injection amount may vary from the commanded water injection amount due to injector errors, water spray impingement errors, vaporization issues from conditions in the vicinity of the injector, etc. This can result in a water injection error that, if not accounted for, can reduce the intended benefits of the water injection and potentially degrade engine performance. Following 328, method 300 ends.

In this way, water injection may be commanded to leverage different benefits at different locations of water injection, including increased cooling, engine efficiency, and fuel economy.

FIG. 4 shows an example method 400 for selecting a water injection location based on engine operating conditions. Method 400 may be performed as part of the method of FIG. 3, such as at 316. As described above, water injection may be used to reduce an in-cylinder temperature and thereby reduce knock. Additionally, injecting water may be used to increase engine dilution and thereby reduce engine pumping losses. Water may be injected into the engine at different locations, such as directly into engine cylinders (e.g., cylinders 180 of FIG. 1 into an exhaust manifold of the engine (e.g., exhaust manifold 136 of FIG. 1), and upstream of a turbocharger turbine (e.g., turbine 16 of FIG. 1) depending on a desired water injection benefit based on engine operating conditions, as described below.

Method 400 begins at 402 and includes estimating and/or measuring engine operating conditions, for example, as further described at 302 of FIG. 3. Engine operating conditions may include exhaust gas temperature, in-cylinder temperature, an amount of boost, an amount of EGR, etc. Engine operating conditions may be measured by sensors of the engine (e.g., sensors 30 of FIG. 1) or inferred based on available data.

At 404, it is determined if a temperature of the turbine ($T_{turbine}$) is greater than a first threshold temperature. For example, the temperature of the turbine may be measured by a temperature sensor positioned at the turbine inlet or estimated based on exhaust temperature, which may be measured by an exhaust temperature sensor (such as exhaust temperature sensor 82 of FIG. 1) or calculated using a model. In one example, the controller may refer to a lookup table, with intake mass air flow, fuel injection quantity, boost pressure, and EGR amount as inputs and an estimated turbine temperature as the output. The first threshold temperature may be set as a protection threshold, above which the turbine may be damaged. The temperature of the turbine may approach the first threshold during high load conditions, for example.

If the temperature of the turbine is not greater than the first threshold temperature, method 400 proceeds to 406 and includes determining an efficiency gain of injecting water upstream of the turbine. The efficiency gain of injecting water upstream of the turbine corresponds to an increase in engine performance and efficiency resulting from injecting water upstream of the turbine. For example, water injection upstream of the turbine leads to a greater turbine driving force for the same amount of fuel, as the water mass increases an exhaust mass flow and water vapor increases the volume driving the turbine, which may in turn increase a mass flow of a compressor of the turbocharger. Further, the increase in performance and efficiency may also be a result of running the engine at stoichiometry or under lean fuel conditions instead of using rich fuel conditions to cool the turbine and other exhaust system components. Further still, a thermal efficiency ($\eta$) of the engine may be increased, as illustrated by the following equation:

$$\eta = 1 - \left(\frac{1}{r^{(\gamma-1)}}\right),$$

wherein $\gamma$ is a specific heat ratio of gas in the cylinder and r is the compression ratio. The compression ratio increases with water injection, thereby decreasing the value subtracted from 1 and resulting in a larger thermal efficiency.

At 408, method 400 includes determining if the efficiency gain of injecting water upstream of the turbine (as determined at 406) is greater than a first threshold. The first threshold is set such that if the efficiency gain is above the first threshold, increases in fuel efficiency and engine power outweigh the drawbacks of water injection at the turbine inlet, which may include unnecessarily depleting water from the water reservoir, cooling exhaust gas below a desired temperature (which may reduce catalyst efficiency, for example), increasing condensation on the turbine (which may lead to degradation of the turbine over time), and/or other drawbacks.

If the efficiency gain of injecting water upstream of the turbine is not greater than the first threshold, method 400 proceeds to 412 and includes not commanding water injection upstream of the turbine. For example, water injection at the turbocharger turbine inlet may be prevented by blocking a flow of water to a water injector positioned at the turbine inlet (e.g., water injector 45 of FIG. 1), for example, by closing (or maintaining closed) a valve (e.g., valve 91 of FIG. 1), not increasing pressure at a high pressure pump (e.g., high pressure pump 85 of FIG. 1) supplying water to the water injector at the turbine inlet, and not opening the water injector at the turbine inlet.

If the efficiency gain of injecting water upstream of the turbine is greater than the first threshold, method 400 proceeds to 410 and includes commanding water injection upstream of the turbine (e.g., at the turbine inlet). For example, the valve restricting water flow from the water reservoir to the injector upstream of the turbine may be commanded open, and water injection may be performed as described with respect to FIG. 3.

Returning to 404, if the temperature of the turbine is greater than the first threshold, method 400 proceeds to 410 and includes commanding water injection upstream of the turbine, as described above.

At 414, method 400 includes determining if the temperature of the catalyst ($T_{catalyst}$) is greater than a second threshold temperature. For example, the temperature of the catalyst may be estimated based on the exhaust temperature, which may be measured using the exhaust temperature sensor or calculated using the model, as described above at 404. In another example, the exhaust temperature may be determined based on a duty cycle of voltage supplied to a heater of an exhaust gas oxygen sensor, such as UEGO sensor 126, with the duty cycle decreasing as the exhaust temperature increases. The second threshold temperature may be set as a second protection threshold, above which the catalyst may be damaged. For example, the temperature of the catalyst may approach the second threshold during high load conditions. In one example, the second threshold is the same value as the first threshold defined at 404. In another example, the second threshold is a different value (e.g., is greater than or less than) the first threshold. Further, if water injection at the turbine inlet is commanded (such as at 410), which may also reduce the temperature of the catalyst, the controller may determine if further catalyst cooling is indicated. For example, further cooling may be indicated if the temperature of the catalyst is at least a threshold above the second threshold.

If the temperature of the catalyst is not greater than the second threshold temperature, method 400 proceeds to 416 and includes not injecting water at the exhaust manifold. For example, water injection at the exhaust manifold may be prevented by blocking a flow of water to a water injector coupled to the exhaust manifold (e.g., water injector 46 of FIG. 1), for example, by closing (or maintaining closed) a valve (e.g., valve 93 of FIG. 1), not increasing pressure at a high pressure pump supplying water to the exhaust manifold water injector (e.g., high pressure pump 83 of FIG. 1), and not opening the exhaust manifold water injector.

If the temperature of the catalyst is greater than the second threshold, method 400 proceeds to 418 and includes commanding water injection at the exhaust manifold. For example, the valve restricting water flow from the water reservoir to the injector coupled to the exhaust manifold may be commanded open, and water injection may be performed as described with respect to FIG. 3. Further, the engine may be run at stoichiometry or under lean fuel conditions instead of using over-enrichment to cool the catalyst, which may increase the power and fuel efficiency of the engine. Water injection at the exhaust manifold may be particularly beneficial for cooling the catalyst during non-turbo applications, for example, when a turbocharged engine is operated under non-boost (e.g., natural engine aspiration) conditions, or when the engine is not equipped with a turbocharger.

At 420, method 400 includes calculating a requested in-cylinder pressure and temperature. For example, the requested in-cylinder pressure and temperature may be calculated based on ECT, engine speed and load, and spark timing. The controller may refer to a lookup table that uses ECT, engine speed and load, and spark timing as an input and provides the in-cylinder pressure and temperature as an output. In another example, the in-cylinder temperature may be inferred from measurements made by a cylinder head temperature sensor.

At 422, it is determined if the temperature of the cylinder ($T_{cylinder}$) is greater than a third threshold temperature. For example, the third threshold temperature may correspond to an in-cylinder temperature above which a tendency for knock increases.

If the temperature of the cylinder is not greater than the third threshold temperature, method 400 proceeds to 424 and includes determining an efficiency gain of injecting water directly into the cylinder. The efficiency gain of injecting water directly into the cylinder corresponds to an increase in performance and efficiency of the engine, for example, due to an increased spark allowance from water injection and increased in-cylinder pressure from water evaporation. For example, the controller may refer to a lookup table that uses spark timing, in-cylinder pressure, and temperature loss from water evaporation as inputs and the efficiency gain of injecting water directly into the cylinder as the output. Further, a dilution from water injection directly into the cylinder can be removed faster than EGR, thereby avoiding combustion instability from excessive EGR. Therefore, the spark benefit and cooler air intake valve temperature achievable through water injection directly into the cylinder may be favored over high levels of EGR, and may further avoid using fuel enrichment for cooling. Conversely, water injection may be contraindicated if the increased in-cylinder pressure resulting from in-cylinder water injection would exceed a peak cylinder pressure.

At 426, it is determined if the efficiency gain of injecting water directly into the cylinder is greater than a second threshold. The second threshold is set such that if the efficiency gain is above the second threshold, increases in fuel efficiency and engine power outweigh the drawbacks of in-cylinder water injection, which may include unnecessarily depleting water from the water reservoir, potential combustion stability issues, and/or other drawbacks.

If the efficiency gain of injecting water directly into the cylinder is not greater than the second threshold, method 400 proceeds to 428 and includes not commanding water injection into the cylinder. For example, water injection directly into the cylinder may be prevented by blocking a flow of water to a water injector positioned to inject water directly into the cylinder (e.g., water injector 47 of FIG. 1), for example, by closing (or maintaining closed) a valve (e.g., valve 97 of FIG. 1), not increasing pressure at a high pressure pump supplying water to the water injector (e.g., high pressure pump 84 of FIG. 1), and not opening the water injector. Following 428, method 400 ends.

Returning to 426, if the efficiency gain of injecting water into the cylinder is greater than the second threshold, method 400 proceeds to 430 and includes commanding water injection into the cylinder. For example, the valve restricting water flow from the water reservoir to the injector positioned to inject water directly into the cylinder may be commanded open, and water injection may be performed as described with respect to FIG. 3. Following 430, method 400 ends.

Returning to 422, if the temperature of the cylinder is greater than the third threshold temperature, method 400 proceeds to 430 and includes commanding water injection into the cylinder, as described above.

Thus, water may be injected at one or more locations based on engine operating conditions. For example, water may be injected at all three locations (the turbine inlet, the exhaust manifold, and directly into the cylinder) under high load, high boost conditions when the temperature of the catalyst is exceptionally high. In another example, water injection may be performed at the turbine inlet and not at the exhaust manifold when water injection at the turbine inlet would provide adequate cooling of the catalyst. In still another example, water injection directly into the cylinder may be performed in order to supplement or replace EGR, as dilution from water injection may have a faster control response than EGR, especially under transient engine conditions.

In order to have water available for water injection to be performed as needed, it may be beneficial to collect as much water as possible without impacting fuel economy and vehicle drivability. Turning to FIG. 5, a method 500 is provided for monitoring and controlling a water level of a water reservoir (e.g., water reservoir 63 of FIG. 1) of a water injection system (water injection system 60 of FIG. 1). Method 500 may be performed responsive to an indication that the water level of the water reservoir is low. For example, method 500 may be performed by a controller (e.g., controller 12 of FIG. 1) as part of method 300 of FIG. 3 (such as at 314). In another example, method 500 may be performed continuously, regardless of water injection status.

Method 500 begins at 502 and includes determining the water level in the water reservoir. For example, the water level may be measured by a water level sensor, such as water level sensor 65 of FIG. 1.

At 504, it is determined if the water level is above a first threshold. The first threshold may be a relatively high threshold, such that water levels above the first threshold may indicate water is not being consumed from the water reservoir, even when water injection is commanded. If the water level is above the first threshold, method 500 proceeds to 506 and includes inferring a water filter clog amount. When the water level is above the first threshold, it may indicate a clog in the water filter that is blocking flow of water out of the reservoir, and hence a water filter clog amount is determined. For example, the water filter clog amount may be inferred based on a pressure drop across the water filter (e.g., filter 68 of FIG. 1). In another example, the water filter clog amount may be inferred by tracking the amount of flow through the water filter over time.

At 508, method 500 includes determining if the water filter clog amount is above a clog threshold. For example, if the water filter clog amount is inferred based on the pressure drop across the water filter, the water filter clog amount may be determined to be above the clog threshold if the pressure drop across the filter is greater than a threshold pressure. In another example, if the water filter clog amount is inferred based on the amount of water that has flowed through the filter over time, the water filter clog amount may be determined to be above the clog threshold if the amount of water that has flowed through the water filter is greater than a threshold amount.

If the water filter clog amount is above the clog threshold, method 500 proceeds to 510 and includes adjusting a drain valve position to isolate the water reservoir from water injectors and enable flow to a drain passage. For example, a drain valve, such as valve 98 of FIG. 1, may be actuated to a position that blocks the flow of water from the water reservoir to the water injectors while enabling the flow of water from the water injectors to the drain passage (e.g., drain passage 58 of FIG. 1).

At 512, method 500 includes reverse flowing a water pump for a duration. For example, the pumping direction of the water pump (e.g., water pump 62 of FIG. 1) may be reversed to facilitate the flow of water from the water injectors back through the water filter and to the drain passage, thereby pushing out debris that may have accumulated in the filter and contributed to filter clogging. Water containing filter debris may then drain to the vehicle exterior via the drain passage and not return to the water reservoir due to the drain valve being positioned to block the flow of water from the water pump to the water reservoir. In one example, the duration is in a range of 3 to 8 seconds (e.g., 5 seconds).

At 514, method 500 includes stopping the water pump, closing the drain valve, and restoring the reservoir connection to the water injectors. For example, the drain valve may be actuated to a position that allows water to flow from the water reservoir to the water pump (and the water injectors downstream of the water pump) and not through the drain passage. Following 514, method 500 ends.

Returning to 508, if the water filter clog amount is not greater than the clog threshold (e.g., it is less than or equal to the clog threshold), method 500 proceeds to 522 and includes continuing water injection responsive to engine demand, as described with respect to FIG. 3. Following 522, method 500 ends.

Returning to 504, if the water level is not above the first threshold (e.g., it is less than or equal to the first threshold), method 500 proceeds to 516 and includes determining if the water level is less than a second threshold, lower than the first threshold. The second threshold may be an intermediate threshold, such that water is available for consumption, but may be quickly depleted if a rate of water consumption is high. For example, the rate of water consumption may be high if water is used by a plurality of water-consuming devices (e.g., the water injection system, an engine coolant system, a windshield wiper fluid system, and a drinking water system) within a specified duration (e.g., one hour). If the water level is not less than the second threshold, method 500 proceeds to 522 and includes continuing water injection responsive to engine demand, as described with respect to FIG. 3.

If, at 516, it is determined that the water level is less than the second threshold, the method proceeds to refill the water reservoir. Accordingly, method 500 proceeds to 518 and includes turning on an AC compressor during engine deceleration events. Water may condense at the AC compressor as the AC compressor cools air. Thus, the AC compressor may be used to generate water from air. For example, during a braking event, the controller may increase the load on the AC compressor and open a valve fluidically coupled to the AC compressor to supply condensate from the AC compressor to the water reservoir, thereby refilling it.

It should be noted that water may also be collected from other water sources, as described with respect to FIG. 1. For example, condensate may be collected from an EGR cooler, a charge air cooler, and an exhaust passage, particularly when ambient humidity is high (e.g., above a threshold humidity level) or following a water injection event. In one example, when ambient humidity is greater than the threshold, condensate is supplied from the charge air cooler to the water reservoir by opening a valve fluidically coupled to the charge air cooler. In another example, when ambient humidity is greater than the threshold, condensate is supplied from the exhaust passage to the water reservoir by opening a valve fluidically coupled to an exhaust condensate collector. Water may also be supplied from a fuel-water separator, which may store water in a fuel-water separator collection tank during a fuel tank refill event. Subsequently, water may be supplied from the fuel-water separator collection tank to the water reservoir by opening a valve fluidically coupled to the fuel-water separator collection tank.

At 520, it is determined if the water level is less than a third threshold, lower than the second threshold. The third threshold may be a relatively low threshold, such that a limited amount of water is available for consumption, and therefore, the use of the remaining water may be prioritized according to the water-consuming device. If the water level is not less than the third threshold (e.g., the water level is greater than or equal to the third threshold), method 500 proceeds to 522 and includes continuing water injection responsive to engine demand, as described above. If the water level is less than the third threshold, method 500 proceeds to 524 and includes performing water injection responsive to engine demand, as described with respect to FIG. 3, while disabling (e.g., blocking) water distribution to other vehicle system water-consuming components (e.g., the windshield wiper fluid system, the engine coolant system, the drinking water system, etc.). As a one-time exception until the water level is restored about the second threshold (defined at 516), if a level of coolant in the engine coolant system is below a threshold coolant level, the engine coolant system may receive a fraction (e.g., one-half) of the remaining water.

In another example, a vehicle operator may engage a manual control of the water system. For example, if the vehicle is being driven through a dry, desolate environment, such as a desert, the vehicle operator may disable water injection once the water level reaches the third threshold and reserve water for the drinking water system. Thus, even though water injection may lead to increased engine efficiency and power, the vehicle operator may elect to forego those benefits in order to have water available for drinking.

At 526, method 500 includes determining if the water level is less than a fourth threshold, lower than the third threshold. For example, if the water level is at the fourth threshold, the water reservoir may be nearly empty. If the water level is not less than the fourth threshold (e.g., the water level is greater than or equal to the fourth threshold), method 500 returns to 524 and includes performing water injection responsive to engine demand, as described with respect to FIG. 3, while disabling water distribution to other vehicle system components, as described above. If, at 526, the water level is less than the fourth threshold, the method proceeds to 528 and includes disabling water injection and setting a notification that the water reservoir level is low. For example, if the water level is less than the fourth threshold, there may not be enough water to reliably inject a commanded amount of water. Following 528, method 500 ends.

In this way, method 500 may be used to monitor and control an amount of water in a water reservoir, which may not only supply water for water injection, but also for a plurality of water-consuming devices. By actively collecting water when the water level is determined to be low (e.g., below the second threshold), water refill events may be increased from those that may passively occur. Further, by controlling which water consuming devices may receive water based on water supply engine efficiency and fuel economy may be increased (e.g., by prioritizing water injection over windshield wiper fluid supply) with an option of a vehicle operator switching to manual control.

In order to ensure that a water injection system (such as water injection system 60 of FIG. 1) in an engine system is functioning as anticipated, a controller (e.g., controller 12 of FIG. 1) may perform diagnostic tests on the water injection system. For example, if a component of the water injection system is degraded, a different amount of water may be injected than commanded, which may lead to reduced engine efficiency and power compared with the commanded amount of water being injected. FIGS. 6 and 7 show two example methods for diagnosing the water injection system. Method 600 of FIG. 6 is a non-intrusive diagnostic test, and as such, method 600 may be performed opportunistically (e.g., without altering water injection command). Method 700 of FIG. 7 is an intrusive diagnostic test and may be performed to validate the results of the non-intrusive diagnostic test of FIG. 6 or responsive to a command to perform the intrusive diagnostic test, such as when the non-intrusive diagnostic test will not yield satisfactory results. For example, the intrusive diagnostic test may be commanded after a first threshold duration has passed since the last intrusive diagnostic test was performed (e.g., 3 months). In another example, the intrusive diagnostic test may be performed if the engine has been operated without commanded water injection for a second threshold duration.

Beginning with FIG. 6, method 600 begins at 602 and includes estimating and/or measuring engine operating conditions, for example, as further described at 302 of FIG. 3. Engine operating conditions may include engine speed and load, an amount of boost, an amount of EGR, etc. Engine operating conditions may be measured by sensors of the engine (e.g., sensors 30 of FIG. 1) or inferred based on available data.

At 604, it is determined if entry conditions for the non-intrusive diagnostic test are met. For example, entry conditions may include the engine being warm (e.g., above a threshold temperature). For example, engine temperature may be measured using an engine coolant temperature sensor, such as ECT sensor 25 of FIG. 1. If the entry conditions for the non-intrusive diagnostic test are not met, method 600 proceeds to 606 and includes maintaining engine operating conditions. For example, the non-intrusive diagnostic test will not be performed, and water injection commands will not be altered. Following 606, method 600 ends.

If the entry conditions for the non-intrusive are met, method 600 proceeds to 608 and includes estimating an exhaust temperature when water injection is not performed using an engine model ($T_{model1}$). For example, the exhaust temperature may be estimated based on a current AFR, spark timing, an amount of EGR, an amount of boost, engine speed, and engine load. The controller may refer a lookup table with the AFR, spark timing, the amount of EGR, the amount of boost, the engine speed, and the engine load as the inputs and receive the estimated exhaust temperature as the output. At 610, method 600 includes measuring the exhaust temperature when water injection is not performed (e.g., at the same time as $T_{model1}$ is determined at 608). For example, the exhaust temperature may be measured using an exhaust temperature sensor (e.g., exhaust temperature sensor 82 of FIG. 1) or may be determined based on a duty cycle of activation of a UEGO heater, such as for UEGO sensor 126 of FIG. 1.

At 612, method 600 includes determining an absolute value of a difference between the modeled exhaust temperature ($T_{model1}$, as estimated at 608) and the measured exhaust temperature when water injection is not performed (T, as measured at 610). For example, the measured exhaust temperature may be subtracted from the modeled exhaust temperature ($|T_{model1}-T|$) or vice versa, as the magnitude of the difference is determined. This value may then be stored in a memory of the controller.

At 614, method 600 includes performing water injection responsive to engine demand, as described with respect to FIG. 3. Because method 600 is a non-intrusive diagnostic test, water injection will not be commanded solely for the purpose of the test.

At 616, method 600 includes estimating the exhaust temperature following water injecting using the engine model ($T_{model2}$), as described above at 608. Cooling effects resulting from water injection are not accounted for using the engine model, so $T_{model2}$ is expected to be higher than the actual exhaust temperature.

At 618, method 600 includes measuring the exhaust temperature following water injection ($T_{water}$) (e.g., at the same time as $T_{model2}$ is determined at 616). Regardless of injection location, the temperature of the exhaust gas is expected to decrease due to an evaporative cooling effect of the injected water. Thus, $T_{water}$ is expected to be a lower value than $T_{model2}$.

At 620, method 600 includes determining an absolute value of a difference between the modeled exhaust temperature following water injection ($T_{model2}$, as estimated at 616) and the measured exhaust temperature following water injection ($T_{water}$, as measured at 618). For example, the measured exhaust temperature following water injection may be subtracted from the modeled exhaust temperature following water injection ($|T_{model2}-T_{water}|$) or vice versa, as the magnitude of the difference is determined. This value may then be stored in the memory of the controller.

At 622, it is determined if $|T_{model2}-T_{water}|$ greater than $|T_{model1}-T|$. During water injection, the temperature of the exhaust is expected to decrease, as described above. Thus, if the water injection system is functioning, the difference between the measured exhaust temperature following water injection ($T_{water}$) and the modeled exhaust temperature following water injection water, ($T_{model2}$, which does not take into account the cooling effect of water injection) is expected to be greater than the difference between the measured exhaust temperature when water injection is not performed (T) and the modeled exhaust temperature when water injection is not performed ($T_{model1}$).

If $|T_{model2}-T_{water}|$ is greater than $|T_{model1}-T|$, method 600 proceeds to 624 and includes logging the test results at the controller and continuing water injection responsive to engine demand, as described with respect to FIG. 3. For example, it may be recorded that the non-intrusive test was performed and that the test passed.

If $T_{model2}-T_{water}|$ is not greater than $|T_{model1}-T|$, method 600 proceeds to 626 and includes setting a diagnostic trouble code (DTC) and logging the test results at the controller. The DTC may indicate that the water injection system is degraded, for example.

At 628, method 600 optionally includes performing an intrusive diagnostic test (e.g., method 700 of FIG. 7). The intrusive diagnostic test may be performed to confirm water injection system degradation, as described below. Following 628, method 600 ends.

Continuing to FIG. 7, method 700 begins at 702 and includes estimating and/or measuring engine operating conditions, for example, as further described at 302 of FIG. 3. Engine operating conditions may include engine speed and load, engine temperature, an amount of boost, an amount of EGR, etc. Engine operating conditions may be measured by sensors of the engine (e.g., sensors 30 of FIG. 1) or inferred based on available data.

At 704, it is determined if entry conditions for the intrusive test are met. For example, entry conditions may include the engine being warm (e.g., above a threshold temperature) and operating in steady-state. Steady-state may be defined as the engine speed/load being within a threshold range for a continuous duration (e.g., one second), for example.

If entry conditions for the intrusive test are not met, method 700 proceeds to 706 and includes maintaining engine operating conditions. For example, water injection command will not be altered, and the intrusive diagnostic test will not be performed. Following 706, method 700 ends.

If, at 704, entry conditions for the intrusive test are met, method 700 proceeds to 708 and includes disabling the water injection system for a first duration. In one non-limiting example, the first duration is between 1 and 5 seconds (e.g., 2 seconds).

At 710, method 700 includes measuring the exhaust humidity (H1) or measuring the exhaust temperature (T1). As both parameters exhibit a measureable change following water injection, either exhaust humidity or exhaust temperature may be used to determine a condition of the water injection system, as described further below. In one example, exhaust humidity is measured by a humidity sensor. In another example, exhaust humidity may be determined using an exhaust gas oxygen sensor (e.g., UEGO sensor 126 of FIG. 1), as described with respect to FIG. 1. Similarly, exhaust temperature may be measured by an exhaust temperature sensor (e.g., exhaust temperature sensor 82 of FIG. 1) or may be determined based on an amount of power supplied to a heater of the exhaust gas oxygen sensor.

At 712, method 700 includes activating the water injection system and injecting water for a second duration. The water injection may occur at one or more locations in the engine system. In some examples, water may be injected at one location per execution of method 700 in order to identify location-specific degradation of the water injection system. In one non-limiting example, the second duration is between 1 and 5 seconds. For example, the second duration may be the same as the first duration.

At 714, method 700 includes measuring the exhaust humidity (H2) or measuring the exhaust temperature (T2). Thus, H1 corresponds to the exhaust humidity (as measured at 710) at a first time (e.g., before water injection), and H2 corresponds to the exhaust humidity at a second time (e.g., after water injection). Similarly, T1 corresponds to the exhaust temperature (as measured at 710) at the first time, and T2 corresponds to the exhaust temperature at the second time.

At 716, method 700 includes calculating a difference between H2 and H1 (H2-H1) or calculating a difference between T1 and T2 (T1-T2). If exhaust humidity is measured at 710 and 714, the difference between H2 and H1 is determined; if exhaust temperature is measured at 710 and 714, the difference between T1 and T2 is determined. Whereas exhaust humidity is expected to increase following water injection (e.g., H2 is expected to be greater than H1), exhaust temperature is expected to decrease following water injection (e.g., T1 is expected to be greater than T2).

At 718, it is determined if H2-H1 is greater than a humidity threshold or T1-T2 is greater than a temperature threshold. As at 716, whether H2-H1 or T1-T2 is used depends on whether exhaust humidity or exhaust temperature was measured at 710 and 714. The humidity threshold may be set to define a minimum value for an expected increase in exhaust humidity if the commanded amount of water is injected. Similarly, the temperature threshold may be set to define a minimum value for an expected decrease in exhaust temperature if the commanded amount of water is injected.

If H2-H1 is greater than the humidity threshold or T1-T2 is greater than the temperature threshold, method 700 proceeds to 720 and includes logging the test results at the controller and continuing water injection as requested, as described with respect to FIG. 3. For example, it may be recorded that the test was performed and that the test passed. If method 700 was performed as part of method 600 of FIG. 6 (e.g., at 628), the non-intrusive water injection system diagnostic test, it may be assumed that another source of degradation (other than the water injection system) led to the non-intrusive diagnostic test not passing. Following 720, method 700 ends.

If, at 718, H2-H1 is not greater than the humidity threshold or T1-T2 is not greater than the temperature threshold, method 700 proceeds to 722 and includes setting a DTC and logging the test results at the controller. The DTC may indicate that the water injection system is degraded, for example.

At 724, method 700 includes disabling the water injection system (or, if only one water injector was determined to be degraded while the other injectors are functioning, the method may include disabling water injection for the degraded injector while maintaining water injection at the functional injectors) and adjusting engine operating parameters to provide requested power and cooling. For example, fuel enrichment may be used for catalyst and turbine cooling. Following 724, method 700 ends.

In this way, FIGS. 6 and 7 provide example methods for determining if a water injection system is functioning as expected. For example, if water injection is used for cooling, if the water injection system is degraded, an amount of cooling may be less than anticipated, which may lead to catalyst overheating, turbine overheating, and/or an increased occurrence of knock, for example. Further, the engine may not benefit from increased power and efficiency.

FIG. 8 shows an example timeline 800 for performing water injection at various locations in a turbocharged engine system (e.g., engine system 100 of FIG. 1), including directly into cylinders of the engine, in an exhaust manifold of the engine, or at an inlet of a turbine of a turbocharger. For example, water injection may be performed according to the method of FIG. 3, with the water injection location(s) selected responsive to engine demand (e.g., according to the example method of FIG. 4). Engine load is shown at plot 802, in-cylinder water injection is shown at plot 804, exhaust manifold water injection is shown at plot 806, turbine inlet water injection is shown at plot 808, MCT is shown at plot 810, MAP is shown at plot 812, exhaust temperature is shown at plot 816, and water level is shown at plot 820. Further, atmospheric pressure is indicated by dashed line 814, a threshold exhaust temperature is indicated by dashed line 818, a first threshold water level is indicated by dashed line 822*a*, a second threshold water level is indicated by dashed line 822*b*, a third threshold water level is indicated by dashed line 822*c*, and a fourth threshold water level is indicated by dashed line 822*d*. For all of the above, the X-axis represents time, with time increasing from left to right. The Y-axis refers to the labeled parameter, with values increasing from bottom to top, except for plots 804, 806, and 808, in which water injection at the specified location is indicated as "on" or "off."

Beginning at time t0, MAP, as shown in plot 812 and as measured by a MAP sensor (e.g., MAP sensor 24 of FIG. 1) is less than atmospheric pressure (indicated by dashed line 814). For example, at time t0, the engine load (plot 802) is low, and therefore, the engine is operated under natural aspiration conditions. The exhaust temperature (plot 816), as measured by a temperature sensor (such as exhaust temperature sensor 82 of FIG. 1), is also low due to the low engine load. As described with respect to FIG. 4, the exhaust temperature may be used in determining a temperature of the turbocharger turbine and a temperature of a catalyst. Thus, with the exhaust temperature below the threshold exhaust temperature indicated by dashed line 818—above which damage to exhaust components, such as the turbine and the catalyst, may occur—water injection at the exhaust manifold (plot 806) and water injection at the turbine inlet (plot 808) are not commanded and remain off. Further, MCT, as measured by a temperature sensor (e.g., MCT sensor 23 of FIG. 1) also remains relatively low. A high MCT may lead to high in-cylinder temperatures. At a low MCT and a low engine load, in-cylinder water injection (plot 804) remains off.

The water level (plot 820) of a water reservoir storing water for water injection (e.g., water reservoir 63 of FIG. 1), among other water uses, is above a first threshold indicated by dashed line 822*a*, indicating that water is available for injection as commanded. As described with respect to FIG. 5, with the water level above the first threshold, a controller may determine if a water filter in a passage coupling the water reservoir to the water injectors is clogged.

Between time t0 and time t1, the engine load (plot 802) increases responsive to driver demand. The exhaust temperature (plot 816) increases, as more fuel is combusted as the engine load increases. MAP (plot 812) also increases, as more exhaust being produced increases a speed of the turbocharger turbine, which in turn increases a speed of a compressor of the turbocharger. At time t1, responsive to MAP being greater than atmospheric pressure (dashed line 814), the engine is operated under boost conditions. MCT also increases, as shown in plot 810, due to heat generated from a compression of intake air by the turbocharger compressor.

At t2, responsive to the exhaust temperature (plot 816) reaching the threshold exhaust temperature (dashed line 818), water injection is performed at the turbine inlet (plot 808) until the exhaust temperature decreases below the threshold exhaust temperature. The amount of water injected may be controlled by one or more of varying a position of a valve that restricts water flow from the water reservoir to a water injector at the turbine inlet (e.g., water injector 45 of FIG. 1), a duty cycle of activation of the water injector at the turbine inlet, and a duty cycle of activation of a high pressure pump configured to deliver pressurized water to the water injector at the turbine inlet.

Although both water injection at the turbocharger turbine inlet and water injection at the exhaust manifold may lead to cooler exhaust temperatures (and therefore cooler exhaust system components), water injection at the turbine inlet may be favored over water injection at the exhaust manifold during turbo applications. For example, water injection at the turbine inlet increases turbine efficiency due to the increased mass of the injected water, leading to an increase in boost pressure, as shown by the increase in MAP following turbine inlet water injection (plot 812). The increase in boost pressure, due to increased compression by the compressor, further increases MCT (plot 810). As a result, at time t3, in-cylinder water injection (plot 804) is performed to decrease in-cylinder temperatures and to reduce an occurrence of knock, for example. This further cools exhaust gas temperatures, as shown in plot 816.

At time t4, although the exhaust temperature (plot 816) remains below the threshold exhaust temperature (dashed line 818), water injection is again performed at the turbine inlet due to the efficiency gain of injecting water upstream of the turbine being greater than a threshold efficiency gain, as described with respect to FIG. 4. This again leads to an increase in MAP (plot 812), as an increased turbine speed leads to an increased compressor speed. MCT (plot 810) also increases following the increase in MAP, as described above. Further, by keeping the turbine cool during extended high load conditions, the engine may be operated at stoichiometry instead of using fuel enrichment to cool the turbine.

Between time t2 and time t5, the water level (plot 820) decreases as water is consumed through water injection. For example, between time t4 and time t5, the water level decreases below the third threshold level (dashed line 822c). As such, water injection may be performed responsive to engine demand, but water distribution to other vehicle system components, such as a coolant system and a drinking water system, may be disabled, as described with respect to FIG. 5 and as further illustrated in FIG. 9. Because the water level is also less than the second threshold (dashed line 822b), an AC system compressor may be turned on during engine deceleration events in order to refill the tank with water condensed at the AC system compressor, as also described with respect to FIG. 5.

At time t5, an engine deceleration event occurs, as illustrated by a decrease in engine load (plot 802). The engine transitions from boosted operation to natural engine aspiration, as indicated by MAP (plot 812) dropping below atmospheric pressure (dashed line 814). The AC system compressor is turned on, and the water level increases (plot 820) as condensed water is collected. Water may also be collected from other vehicle water sources, such as from a charge air cooler, through exhaust recovery, etc.

The engine load increases again following the deceleration event (e.g., after reaching a minimum), as shown in plot 802. However, the engine load is not high enough for boost conditions, and MAP (plot 812) remains below atmospheric pressure (dashed line 814). The exhaust temperature (plot 816) increases as more fuel is consumed responsive to the increase in engine load. At time t6, the exhaust temperature surpasses the threshold exhaust temperature (dashed line 818). As a result, water injection is commanded at the exhaust manifold to reduce the exhaust temperature, as shown in plot 806. As water is injected at the exhaust manifold, the water level (plot 820) again decreases and drops below the second threshold water level (dashed line 822b). With the water level below the second threshold water level, the AC compressor may again be turned on during the next engine deceleration event.

Turning to FIG. 9, an example timeline 900 of regulating different water consuming devices in a vehicle (e.g., motor vehicle 102 of FIG. 1) responsive to a water level in a water reservoir (e.g., water reservoir 63 of FIG. 1), for example, according to the method of FIG. 5, is shown. As described with respect to FIG. 5, different water consuming devices, including a water injection system (e.g., water injection system 60 of FIG. 1), a windshield wiper fluid system, an engine coolant system, and a drinking water system, may be prioritized depending on the water level. The water injection system is shown in plot 902, the windshield wiper fluid system is shown at plot 904, the engine coolant system is shown at plot 906, and the drinking water system is shown at plot 908. Similar to plot 820 of FIG. 8, the water level is shown at plot 920, with a first threshold water level indicated by dashed line 922a, a second threshold water level indicated by dashed line 922b, a third threshold water level indicated by dashed line 922c, and a fourth threshold water level indicated by dashed line 922d. For all of the above, the X-axis represents time, with time increasing along the X-axis from left to right. The Y-axis corresponds to the labeled parameter. For plots 902, 904, 906, and 908, water consumption by the indicated device is shown as "enabled" or "disabled." Note that when water consumption is enabled for a particular device, the device is not necessarily actively using water; for example, water injection may not be commanded even when the water injection system is enabled. Instead, "enabled" refers to the ability of each water-consuming device to draw water from the water reservoir responsive to vehicle demands. For plot 920, the Y-axis, water level, increases from top to bottom.

Prior to time t1, the water level (plot 920) is above the first threshold water level (dashed line 922a). The water injection system (plot 902), windshield wiper fluid system (plot 904), engine coolant system (plot 906), and drinking water system (plot 908) are all enabled. Further, as described with respect to FIG. 5, with the water level above the first threshold water level, a water filter may be cleaned if it is determined to be clogged.

As water is used by the water-consuming devices, the water level (plot 920) decreases. At time t1, the water level drops below the first threshold water level (dashed line 922a). Thus, the water filter may no longer be cleaned. However, water consumption by the water injection system (plot 902), the windshield wiper fluid system (plot 904), the engine coolant system (plot 906), and the drinking water system (plot 908) remains enabled.

At time t2, the water level (plot 920) decreases below the second threshold water level (dashed line 922b) as water is consumed. When the water level is below the second threshold water level, water may be supplied from one or more water sources based on water supply conditions. In one example, a controller may turn on a compressor of an AC system during engine braking events. Excess alternator energy may be available during the engine braking events, which may be used to increase a load on the AC compressor. In another example, when ambient humidity is high (e.g., greater than a threshold ambient humidity), condensate may be supplied from a charge air cooler coupled to an intake passage or from an exhaust condensate collector. In still another example, during a fuel tank refill event, water may be collected in a fuel-water separator collection tank, which may then supply water to the reservoir by opening a valve. As shown in plot 920, between time t2 and time t3, the water reservoir is refilled with water from the one or more water sources and increases above the second threshold water level (dashed line 922b). However, as water continues to be consumed, the water level (plot 920) decreases below the second threshold water level (dashed line 922b) and continues to decrease.

At time t3, the water level (plot 920) drops below the third threshold water level (dashed line 922c). Responsive to the water level decreasing below the third threshold water level, the windshield wiper fluid system (plot 904), engine coolant system (plot 906), and drinking water system (plot 908) are disabled from receiving water from the water reservoir. The water injection system (plot 902) remains enabled, as supplying water to the water injection system is prioritized. However, in the example of FIG. 9 the engine coolant level drops below a threshold coolant level (not shown). As a result, the engine coolant system is temporarily enabled (plot 906), and half of the remaining water is supplied to the engine coolant system, as shown by the decrease in the water level (plot 920). Water also continues to be supplied to the water injection system (plot 902) responsive to engine demand.

At time t4, the water level drops below the fourth threshold water level (dashed line 922d), as shown in plot 920. As a result, the water injection system (plot 902) is disabled. The windshield wiper fluid system (plot 904), engine coolant system (plot 906), and drinking water system (plot 908) remain disabled.

The water reservoir undergoes a refilling event, and at time t5, the water level (plot 920) surpasses the fourth threshold water level (dashed line 922d). As a result, the water injection system is enabled, as shown in plot 902. The windshield wiper fluid system (plot 904), engine coolant system (plot 906), and drinking water system (plot 908) remain disabled until the water level (plot 920) surpasses the third threshold water level (dashed line 922c), at which time they are enabled.

At time t6, the water level (plot 920) again decreases below the third threshold water level (dashed line 922c). As a result, the windshield wiper fluid system (plot 904), engine coolant system (plot 906), and drinking water system (plot 908) are disabled. The water injection system (plot 902) remains enabled. However, in the example of FIG. 9, a vehicle operator engages a manual control of water distribution and disables the water injection system (plot 902) while enabling the drinking water system (plot 908). Thus, the vehicle operator is able to prioritize water for drinking. Instead of using water injection for cooling, the controller may instead use fuel enrichment to decrease a temperature of a catalyst or a turbocharger turbine, for example.

In this way, water may be supplied from a single water reservoir to a plurality of water-consuming devices in a vehicle, including one or more water injectors, based on operating conditions. By using a single reservoir, manufacturing costs may be reduced. Further, in order to ensure water is available when water injection is commanded, a water level of the water reservoir may be monitored and the water reservoir refilled via a water collection system when the water reservoir is low. Further still, water injection may be prioritized over other water-consuming devices when the water level of the water reservoir is low. By ensuring that water is available when water injection is commanded, engine cooling and efficiency benefits may be realized. For example, water injection may be used at various places in the engine system, including within engine cylinders, at an exhaust manifold, and at an inlet of a turbocharger turbine, to lower exhaust temperatures and increase engine efficiency, thus increasing fuel economy.

The technical effect of injecting water stored at a water reservoir into one or more of an engine cylinder, an exhaust manifold, and a turbocharger turbine inlet via one or more water injectors of a water injection system based on engine operating conditions is that engine power and efficiency may be increased.

As one example, a method is provided, comprising, responsive to a turbine temperature being greater than a threshold temperature, injecting water stored at a water reservoir to an inlet of a turbine of a turbocharger; responsive to the turbine temperature being less than the threshold temperature and a determined efficiency gain being greater than a threshold gain, injecting water stored at the water reservoir to the inlet of the turbine; and responsive to the turbine temperature being less than the threshold temperature and the determined efficiency gain being less than the threshold gain, blocking injection of water stored at the water reservoir to the inlet of the turbine. In the preceding example, additionally or optionally, the determined efficiency gain is determined based on an increased mass flow of a compressor of the turbocharger resulting from an increased exhaust mass flow from the injected water increasing the speed of the turbine, the increased exhaust mass flow determined based on a desired flow rate of the injected water and a desired duration of injecting water. In any or all of the preceding examples, additionally or optionally, injecting water stored at the water reservoir to the inlet of the turbine comprises injecting water via a water injector positioned at the inlet of the turbine, and further comprising maintaining a temperature of the water in the water injector below a vaporization point by one or more of adjusting a pressure from a high pressure pump configured to supply water to the water injector, opening the water injector, and adjusting a duty cycle of the water injector. In any or all of the preceding examples, the method additionally or optionally further comprises, responsive to injecting water stored at the water reservoir to the inlet of the turbine when the turbine temperature is greater than the threshold temperature, operating an engine positioned upstream of the turbine at a stoichiometric air-fuel ratio.

As another example, a method is provided, comprising injecting water stored at a water reservoir into one or more of an engine cylinder, an exhaust manifold, and a turbocharger turbine inlet via one or more water injectors of a water injection system based on engine operating conditions; responsive to a first condition, selectively supplying water stored at the water reservoir to one or more of a windshield wiper system, engine coolant system, and drinking water system based on respective water levels in the windshield wiper system, engine coolant system, and drinking water system; and responsive to a second condition, blocking the supply of water stored at the water reservoir to the one or more of the windshield wiper system, engine coolant system, and drinking water system regardless of the respective water levels in the windshield wiper system, engine coolant system, and drinking water system. In the preceding example, additionally or optionally, the first condition comprises a water level of the water reservoir being above a first threshold water level and wherein the second condition comprises the water level being below the first threshold water level. In any or all of the preceding examples, the method additionally or optionally further comprises, responsive to the water level being below a second threshold level, supplying water to the water reservoir from one or more water sources based on water supply conditions. In any or all of the preceding examples, additionally or optionally, supplying water to the water reservoir from one or more water sources based on water supply conditions comprises one or more of: when ambient humidity is greater than a threshold, opening a first valve fluidically coupled to a charge air cooler to supply condensate from the charge air cooler to the water reservoir; during a braking event, increasing a load on an air conditioning (AC) compressor and opening a second valve fluidically coupled to the AC compressor to supply condensate from the AC compressor to the water reservoir; during a fuel tank refill event, collecting water in a fuel-water separator collection tank and opening a third valve fluidically coupled to the fuel-water separator collection tank to supply water from the fuel-water separator collection tank to the water reservoir; and when ambient humidity is greater than the threshold, opening a fourth valve fluidically coupled to an exhaust condensate collector to supply condensate from the exhaust condensate collector to the water reservoir. In any or all of the preceding examples, the method additionally or optionally comprises, responsive to the water level being above a third threshold level and a pressure drop across a filter of the water reservoir being greater than a threshold pressure, isolating the water reservoir from the one or more water injectors, opening a relief valve, and reversing flow of a water pump coupled to the water reservoir. In any or all of the preceding examples, additionally or optionally, water stored at the water reservoir is injected into the engine cylinder responsive to one or more of a temperature within the engine cylinder being greater than a threshold temperature and a determined efficiency gain of injecting water into the engine cylinder being greater than a threshold gain. In any or all of the preceding examples, additionally or optionally, the determined efficiency gain of injecting water into the engine cylinder is determined based on an increase in a pressure within the engine cylinder and an allowed spark increase balanced against a temperature loss from water evaporation that would result from injecting water stored at the water reservoir into the engine cylinder. In any or all of the preceding examples, additionally or optionally, water stored at the water reservoir is injected into the exhaust manifold responsive to a temperature of a catalyst being greater than a threshold temperature. In any or all of the preceding examples, additionally or optionally, water stored at the water reservoir is injected into the turbocharger turbine inlet responsive to one or more of a temperature of the turbocharger turbine inlet being greater than a threshold temperature and a determined efficiency gain of injecting water at the turbocharger turbine inlet being greater than a threshold gain. In any or all of the preceding examples, additionally or optionally, the determined efficiency gain of injecting water at the turbocharger turbine inlet is determined based on an increased exhaust mass flow, an exhaust volume, and an increased mass flow of a compressor driven by the turbocharger turbine that would result from injecting water stored at the water reservoir at the turbocharger turbine inlet.

As another example, a system is provided, comprising: a water reservoir fluidically coupled to a water collection system and a plurality of water-consuming devices, each of the water-consuming devices fed by a separate water passage branching from a common water delivery passage; a plurality of solenoid valves each coupled to a respective separate water passage to allow or restrict water flow to each of the water-consuming devices; a low pressure pump coupled to the common water delivery passage; a filter coupled to the common water delivery passage; a drain passage coupled to the common water delivery passage and the water reservoir with a drain valve coupled therein; a water level sensor coupled to the water reservoir configured to measure a level of water in the water reservoir; and a controller storing instructions executable to: allow water flow from the water reservoir to selected water-consuming devices of the plurality of water consuming devices based on the water level in the water reservoir by actuating open each respective solenoid valve in each respective separate water passage feeding each respective selected water consuming device; responsive to the water level in the water reservoir being greater than a first threshold water level, clean the water filter by actuating the drain valve to a position that allows flow from the common water delivery passage to the drain passage and blocks flow from the water reservoir to the low pressure pump and reversing a pumping direction of the low pressure pump; and responsive to the water level in the water reservoir being greater than a second threshold water level, refill the water reservoir with water from the water collection system. In the preceding example, additionally or optionally, the water collection system includes one or more of an air conditioning system compressor, a charge air cooler, an exhaust condensate collector, and a fuel-water separator. In any or all of the preceding examples, additionally or optionally, the controller further stores executable instructions to: responsive to the water level in the water reservoir being less than the second threshold water level, increase a load on the air conditioning system compressor during engine braking conditions. In any or all of the preceding examples, additionally or optionally, the one or more water-consuming devices includes a water injection system, a windshield wiper fluid system, an engine coolant system, and a drinking water system. In any or all of the preceding examples, additionally or optionally, responsive to the water level in the water reservoir being greater than a third threshold water level, the selected water consuming devices includes the water injection system, the windshield wiper fluid system, the engine coolant system, and the drinking water system. In any or all of the preceding examples, additionally or optionally, responsive to the water level in the water reservoir being less than the third threshold water level, the selected water-consuming devices includes only the water injection system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a turbine temperature being greater than a threshold temperature, injecting water stored at a water reservoir to an inlet of a turbine of a turbocharger;
responsive to the turbine temperature being less than the threshold temperature and a determined efficiency gain being greater than a threshold gain, injecting water stored at the water reservoir to the inlet of the turbine; and
responsive to the turbine temperature being less than the threshold temperature and the determined efficiency gain being less than the threshold gain, blocking injection of water stored at the water reservoir to the inlet of the turbine.

2. The method of claim 1, wherein the determined efficiency gain is determined based on an increased mass flow of a compressor of the turbocharger resulting from an increased exhaust mass flow from the injected water increasing the speed of the turbine, the increased exhaust mass flow determined based on a desired flow rate of the injected water and a desired duration of injecting water.

3. The method of claim 1, wherein injecting water stored at the water reservoir to the inlet of the turbine comprises injecting water via a water injector positioned at the inlet of the turbine, and further comprising maintaining a temperature of the water in the water injector below a vaporization point by one or more of adjusting a pressure from a high pressure pump configured to supply water to the water injector, opening the water injector, and adjusting a duty cycle of the water injector.

4. The method of claim 1, further comprising, responsive to injecting water stored at the water reservoir to the inlet of the turbine when the turbine temperature is greater than the threshold temperature, operating an engine positioned upstream of the turbine at a stoichiometric air-fuel ratio.

5. A method comprising:
injecting water stored at a water reservoir into one or more of an engine cylinder, an exhaust manifold, and a turbocharger turbine inlet via one or more water injectors of a water injection system based on engine operating conditions;
responsive to a first condition, selectively supplying water stored at the water reservoir to one or more of a windshield wiper system, engine coolant system, and drinking water system based on respective water levels in the windshield wiper system, engine coolant system, and drinking water system; and
responsive to a second condition, blocking the supply of water stored at the water reservoir to the one or more of the windshield wiper system, engine coolant system, and drinking water system regardless of the respective water levels in the windshield wiper system, engine coolant system, and drinking water system.

6. The method of claim 5, wherein the first condition comprises a water level of the water reservoir being above a first threshold water level and wherein the second condition comprises the water level being below the first threshold water level.

7. The method of claim 6, further comprising, responsive to the water level being below a second threshold level, supplying water to the water reservoir from one or more water sources based on water supply conditions.

8. The method of claim 7, wherein supplying water to the water reservoir from one or more water sources based on water supply conditions comprises one or more of:
when ambient humidity is greater than a threshold, opening a first valve fluidically coupled to a charge air cooler to supply condensate from the charge air cooler to the water reservoir;
during a braking event, increasing a load on an air conditioning (AC) compressor and opening a second valve fluidically coupled to the AC compressor to supply condensate from the AC compressor to the water reservoir;
during a fuel tank refill event, collecting water in a fuel-water separator collection tank and opening a third valve fluidically coupled to the fuel-water separator collection tank to supply water from the fuel-water separator collection tank to the water reservoir; and
when ambient humidity is greater than the threshold, opening a fourth valve fluidically coupled to an exhaust condensate collector to supply condensate from the exhaust condensate collector to the water reservoir.

9. The method of claim 7, further comprising, responsive to the water level being above a third threshold level and a pressure drop across a filter of the water reservoir being greater than a threshold pressure, isolating the water reservoir from the one or more water injectors, opening a relief valve, and reversing flow of a water pump coupled to the water reservoir.

10. The method of claim 5, wherein water stored at the water reservoir is injected into the engine cylinder responsive to one or more of a temperature within the engine cylinder being greater than a threshold temperature and a determined efficiency gain of injecting water into the engine cylinder being greater than a threshold gain.

11. The method of claim 10, wherein the determined efficiency gain of injecting water into the engine cylinder is determined based on an increase in a pressure within the engine cylinder and an allowed spark increase balanced against a temperature loss from water evaporation that would result from injecting water stored at the water reservoir into the engine cylinder.

12. The method of claim 5, wherein water stored at the water reservoir is injected into the exhaust manifold responsive to a temperature of a catalyst being greater than a threshold temperature.

13. The method of claim 5, wherein water stored at the water reservoir is injected into the turbocharger turbine inlet responsive to one or more of a temperature of the turbocharger turbine inlet being greater than a threshold temperature and a determined efficiency gain of injecting water at the turbocharger turbine inlet being greater than a threshold gain.

14. The method of claim 13, wherein the determined efficiency gain of injecting water at the turbocharger turbine inlet is determined based on an increased exhaust mass flow, an exhaust volume, and an increased mass flow of a compressor driven by the turbocharger turbine that would result from injecting water stored at the water reservoir at the turbocharger turbine inlet.

15. A system for water collection and distribution in a vehicle, comprising:
 a water reservoir fluidically coupled to a water collection system and a plurality of water-consuming devices, each of the water-consuming devices fed by a separate water passage branching from a common water delivery passage;
 a plurality of solenoid valves each coupled to a respective separate water passage to allow or restrict water flow to each of the water-consuming devices;
 a low pressure pump coupled to the common water delivery passage;
 a filter coupled to the common water delivery passage;
 a drain passage coupled to the common water delivery passage and the water reservoir with a drain valve coupled therein;
 a water level sensor coupled to the water reservoir configured to measure a level of water in the water reservoir; and
 a controller storing instructions executable to:
  allow water flow from the water reservoir to selected water-consuming devices of the plurality of water consuming devices based on the water level in the water reservoir by actuating open each respective solenoid valve in each respective separate water passage feeding each respective selected water consuming device;
  responsive to the water level in the water reservoir being greater than a first threshold water level, clean the water filter by actuating the drain valve to a position that allows flow from the common water delivery passage to the drain passage and blocks flow from the water reservoir to the low pressure pump and reversing a pumping direction of the low pressure pump; and
  responsive to the water level in the water reservoir being greater than a second threshold water level, refill the water reservoir with water from the water collection system.

16. The system of claim 15, wherein the water collection system includes one or more of an air conditioning system compressor, a charge air cooler, an exhaust condensate collector, and a fuel-water separator.

17. The system of claim 16, wherein the controller further stores executable instructions to:
 responsive to the water level in the water reservoir being less than the second threshold water level, increase a load on the air conditioning system compressor during engine braking conditions.

18. The system of claim 15, wherein the one or more water-consuming devices includes a water injection system, a windshield wiper fluid system, an engine coolant system, and a drinking water system.

19. The system of claim 18, wherein, responsive to the water level in the water reservoir being greater than a third threshold water level, the selected water consuming devices includes the water injection system, the windshield wiper fluid system, the engine coolant system, and the drinking water system.

20. The system of claim 18, wherein, responsive to the water level in the water reservoir being less than the third threshold water level, the selected water-consuming devices includes only the water injection system.

* * * * *